United States Patent
Reicher et al.

(10) Patent No.: US 10,353,581 B1
(45) Date of Patent: Jul. 16, 2019

(54) MOBILE COMPUTER INPUT DEVICES

(71) Applicant: MERGE HEALTHCARE SOLUTIONS INC., Hartland, WI (US)

(72) Inventors: Murray A. Reicher, Rancho Santa Fe, CA (US); Florent Saint-Clair, San Diego, CA (US); Evan K. Fram, Paradise Valley, AZ (US)

(73) Assignee: MERGE HEALTHCARE SOLUTIONS INC., Hartland, WI (US)

( * ) Notice: Subject to any disclaimer, the term of this patent is extended or adjusted under 35 U.S.C. 154(b) by 860 days.

(21) Appl. No.: 13/952,496

(22) Filed: Jul. 26, 2013

Related U.S. Application Data

(60) Provisional application No. 61/676,575, filed on Jul. 27, 2012.

(51) Int. Cl.
*G06F 3/14* (2006.01)
*G06F 3/0488* (2013.01)

(52) U.S. Cl.
CPC ................. *G06F 3/04886* (2013.01)

(58) Field of Classification Search
CPC .......... G06F 3/0482; G06F 3/04883; G06F 3/0488; G06F 3/04886; G06F 3/04842; G06F 2200/1637; H04N 5/4403; H04N 21/43615
See application file for complete search history.

(56) References Cited

U.S. PATENT DOCUMENTS

| | | | | |
|---|---|---|---|---|
| 5,422,751 A * | 6/1995 | Lewis | ............... | G02F 1/133308 349/59 |
| 6,201,554 B1 * | 3/2001 | Lands | ................... | G06F 1/1626 345/156 |
| 6,643,721 B1 * | 11/2003 | Sun | ......................... | G06F 3/038 710/10 |
| 8,228,292 B1 * | 7/2012 | Ruiz | ..................... | G06F 1/1626 345/156 |
| 8,412,269 B1 * | 4/2013 | Cook | .................... | G06F 3/1462 348/14.07 |
| 9,141,329 B1 * | 9/2015 | Reicher | ................. | G06F 3/1446 |
| 2002/0113751 A1 * | 8/2002 | Knopf | ................... | G06F 1/1626 345/4 |
| 2003/0015632 A1 * | 1/2003 | Dunn | ................... | A47B 81/065 248/122.1 |

(Continued)

OTHER PUBLICATIONS

"Touch Mouse" by Logitech, Inc., https://itunes.apple.com/us/app/touch-mouse/id338237450?rmt=8, last accessed Jul. 18, 2013.

(Continued)

*Primary Examiner* — Jose R Soto Lopez
(74) *Attorney, Agent, or Firm* — Michael Best & Friedrich LLP

(57) ABSTRACT

Disclosed are systems and methods for the use of mobile computing devices, such as tablets and/or smartphones, as user-customizable input devices that interface with more sophisticated computer systems (or "parent computing systems"), such as a picture archiving and communication system (PACS) and/or an electronic medical record system (EMR). Further described are systems and methods of mobile device user input and interface optimization and customization based on a user's identity, a parent computing system's characteristics, and/or a tilt angle of a display.

22 Claims, 14 Drawing Sheets

(56) References Cited

U.S. PATENT DOCUMENTS

| | | | | |
|---|---|---|---|---|
| 2004/0150582 | A1* | 8/2004 | Dunn | G09G 3/20 345/1.3 |
| 2005/0178034 | A1* | 8/2005 | Schubert | G09F 9/33 40/605 |
| 2007/0168223 | A1* | 7/2007 | Fors | G06F 19/324 705/2 |
| 2007/0176848 | A1* | 8/2007 | Ferren | G06F 3/0421 345/6 |
| 2008/0052746 | A1* | 2/2008 | Cooper | H04N 7/163 725/80 |
| 2008/0119237 | A1* | 5/2008 | Kim | G06F 3/0481 455/566 |
| 2008/0284694 | A1* | 11/2008 | Dunn | G09G 3/3611 345/87 |
| 2009/0132963 | A1* | 5/2009 | Morita | G06F 9/451 715/834 |
| 2010/0007613 | A1* | 1/2010 | Costa | G06F 1/1601 345/173 |
| 2010/0095240 | A1* | 4/2010 | Shiplacoff | G06F 3/0483 715/784 |
| 2010/0138680 | A1* | 6/2010 | Brisebois | G06F 1/1626 713/324 |
| 2010/0146460 | A1* | 6/2010 | Dunko | G06F 3/0346 715/863 |
| 2011/0209177 | A1* | 8/2011 | Sela | H04N 7/17318 725/39 |
| 2011/0246904 | A1* | 10/2011 | Pinto | G06F 9/452 715/740 |
| 2011/0279224 | A1* | 11/2011 | Jang | G08C 17/02 340/4.31 |
| 2012/0225645 | A1* | 9/2012 | Sivan | G08C 17/02 455/418 |
| 2012/0282905 | A1* | 11/2012 | Owen | H04N 5/235 455/414.1 |
| 2012/0287021 | A1* | 11/2012 | Park | G02F 1/13336 345/1.3 |
| 2013/0067370 | A1* | 3/2013 | Branson | G06F 3/048 715/765 |
| 2013/0141366 | A1* | 6/2013 | Ritter | G06F 3/041 345/173 |
| 2013/0188098 | A1* | 7/2013 | Higashi | H04N 5/4403 348/734 |
| 2013/0324035 | A1* | 12/2013 | Strommen | G06F 3/01 455/41.1 |
| 2014/0184472 | A1* | 7/2014 | Xia | G06F 3/1446 345/1.3 |
| 2014/0211099 | A1* | 7/2014 | Saha | G05B 1/01 348/734 |
| 2014/0268654 | A1* | 9/2014 | Wagner | H05K 9/0054 362/97.1 |
| 2014/0344922 | A1* | 11/2014 | Lam | G06F 21/629 726/19 |

OTHER PUBLICATIONS

"Air Display" by Avatron Software, Android Apps on Google Play, http://play.google.com/store/apps/details?id=com.avatron.airdisplay&hl=en, last accessed Jul. 18, 2013.

"Air Display" by Avatron Software, Inc., http://itunes.apple.com/us/app/air-display/id368158927?rmt=8, last accessed Jul. 18, 2013.

AGFA HealthCare, color brochure "IMPAX 6: Digital Image and Information Management," © 2012 Agfa HealthCare N.V. Downloaded from http://www.agfahealthcare.com/global/en/he/library/libraryopen?ID=32882925. Accessed on Feb. 9, 2015.

AGFA HealthCare, IMPAX 6.5 Datasheet (US)2012. © 2012 Agfa HealthCare N.V. Downloaded from http://www.agfahealthcare.com/global/en/he/library/libraryopen?ID=37459801. Accessed on Feb. 9, 2015.

AMD Technologies, Inc., Catella PACS 5.0 Viewer User Manual (112 pgs), © 2010, AMD Technologies, Inc. (Doc. 340-3-503 Rev. 01). Downloaded from http://www.amdtechnologies.com/lit/cat5viewer.pdf. Accessed on Feb. 9, 2015.

Aspyra's Imaging Solutions, 3 page color print out. Accessed at http://www.aspyra.com/imaging-solutions. Accessed on Feb. 9, 2015.

Avreo, interWorks—RIS/PACS package, 2 page color brochure, © 2014, Avreo, Inc. (Document MR-5032 Rev. 4). Downloaded from http://www.avreo.com/ProductBrochures/MR-5032Rev.%204interWORKS%20RISPACSPackage.pdf. Accessed on Feb. 9, 2015.

BRIT Systems, BRIT Pacs View Viewer, 2 page color brochure, (BPB-BPV-0001). Downloaded from http://www.brit.com/pdfs/britpacsview.pdf. Accessed on Feb. 9, 2015.

BRIT Systems, Roentgen Works—100% Browers-based VNA (Vendor Neutral Archive/PACS), © 2010 BRIT Systems, 1 page color sheet. Accessed at http://www.roentgenworks.com/PACS. Accessed on Feb. 9, 2015.

BRIT Systems, Vision Multi-modality Viewer—with 3D, 2 page color brochure, (BPB-BVV-0001 RECV). Downloaded from http://www.brit.com/pdfs/BPB-BVV-0001REVC_BRIT_Vision_Viewer.pdf. Accessed on Feb. 9, 2015.

CANDELiS, ImageGrid™: Image Management Appliance, 6 page color brochure. (AD-012 Rev. F Nov. 2012), © 2012 Candelis, Inc. Downloaded from http://www.candelis.com/images/pdf/Candelis_ImageGrid_Appliance_20111121.pdf. Accessed on Feb. 9, 2015.

Carestream, Cardiology PACS, 8 page color brochure. (CAT 866 6075 Jun. 2012). © Carestream Health, Inc., 2012. Downloaded from htto://www.carestream.com/cardioPACS_brochure_M1-877.pdf. Accessed on Feb. 9, 2015.

Carestream, Vue PACS, 8 page color brochure. (CAT 300 1035 May 2014). © Carestream Health, Inc., 2014. Downloaded from http://www.carestream.com/csPACS_brochure_M1-876.pdf. Accessed on Feb. 9, 2015.

Cerner, Radiology—Streamline image management, 2 page color brochure, (fl03_332_10_v3). Downloaded from http://cerner.com/uploadedFiles/Clinical_Imaging.pdf. Accessed on Feb. 9, 2015.

CoActiv, EXAM-PACS, 2 page color brochure, © 2014 CoActiv, LLC. Downloaded from http://coactiv.com/wp-content/uploads/2013/08/EXAM-PACS-BROCHURE-final-web.pdf. Accessed on Feb. 9, 2015.

DR Systems, Dominator™ Guide for Reading Physicians, Release 8.2, 546 pages, (TCP-000260-A), © 1997-2009, DR Systems, Inc. Downloaded from https://resources.dominator.com/assets/004/6999.pdf. Document accessed Feb. 9, 2015.

DR Systems, DR Scheduler User Guide, Release 8.2, 410 pages, (TCP-000115-A), © 1997-2009, DR Systems, Inc. Downloaded from https://resources.dominator.com/assets/003/6850.pdf. Document accessed Feb. 9, 2015.

Fujifilm Medical Systems, SYNAPSE® Product Data, Synapse Release Version 3.2.1, Foundation Technologies, 4 page color brochure, (XBUSSY084) Aug. 2008. Downloaded from http://www.fujifilmusa.com/shared/bin/foundation.pdf. Accessed on Feb. 9, 2015.

Fujifilm Medical Systems, SYNAPSE® Product Data, Synapse Release Version 3.2.1, Server Modules and Interfaces, 4 page color brochure, (XBUSSY085) Aug. 2008. Downloaded from http://www.fujifilmusa.com/shared/bin/server-interface.pdf. Accessed on Feb. 9, 2015.

Fujifilm Medical Systems, Synapse® Product Data, Synapse Release Version 3.2.1, Workstation Software, 4 page color brochure, (XBUSSY082) Aug. 2008. Downloaded from http://www.fujifilmusa.com/shared/bin/workstation.pdf. Accessed on Feb. 9, 2015.

GE Healthcare, Centricity PACS, in 8 page printout. Accessed at http://www3.gehealthcare.com/en/product/categories/healthcare_it/medical_imaging_informatics_-_ris-pacs-cvis/centricity_pacs. Accessed on Feb. 9, 2015.

Handylife.com—Overview of Handy Patients Enterprise, in 2 page printout. Accessed from http://www.handylife.com/en/software/overview.html. Accessed on Feb. 18, 2015.

Handylife.com—Features of Handy Patients Enterprise, in 4 page printout. Accessed from http://wwww.handylife.com/en/software/features.html. Accessed on Feb. 18, 2015.

Handylife.com—Screenshots of Handy Patients Enterprise, in 2 page printout. Accessed from http://www.handylife.com/en/software/screenshots.html. Accessed on Feb. 18, 2015.

(56) References Cited

OTHER PUBLICATIONS iCRco, I See the Future, in 12 pages, color brochure, (BR080809AUS), © 2009 iCRco.ClarityPACS. Downloaded from http://www.claritypacs.com/pdfs/ISeeFuture_26_Web.pdf. Accessed on Feb. 9, 2015.

imageanalysis, dynamika, 2 page color brochure. Downloaded from httb://www.imageanalysis.org.uk/what-we-do. Accessed on Feb. 9, 2015.

imageanalysis, MRI Software, in 5 page printout. Accessed at httb://www.imageanalysis.org.uk/mri-software. Accessed on Feb. 9, 2015.

IMSI, Integrated Modular Systems, Inc., Hosted / Cloud PACS in one page printout. Accessed at http://www.imsimed.com/#!products-services/ctnu. Accessed on Feb. 9, 2015.

Infinitt, PACS, RIS, Mammo PACS, Cardiology Suite and 3D/Advanced Visualization | Infinittna, 2 page printout. Accessed at htth://www.infinittna.com/products/radiology/radiology-pacs. Accessed on Feb. 9, 2015.

Intelerad, IntelePACS, 2 page color brochure, © 2014 Intelerad Medical Systems Incoprorated. Downloaded http://www.intelerad.com/wp-content/uploads/sites/2/2014/08/IntelePACS-brochure.pdf. Accessed on Feb. 9, 2015.

Intelerad, InteleViewer, 2 page color brochure, © 2014 Intelerad Medical Systems Incoprorated. Downloaded from http://www.intelerad.com/wp-content/uploads/sites/02/2014/09/InteleViewer-brochure.pdf. Accessed on Feb. 9, 2015.

Intuitive Imaging Informatics, ImageQube, 1 page in color. Downloaded from http://www.intuitiveimaging.com/2013/pdf/ImageQube%20one-sheet.pdf. Accessed on Feb. 9, 2015.

Kuhl, Helen: Comparison Chart/PACS, Customers Are Happy, But Looking for More, (color) Imaging Techology News, itnonline.com, May 2012, pp. 24-27. Downloaded from http://www.merge.com/MergeHealthcare/media/company/In%20The%20News/merge-pacs-comparison.pdf. Accessed on Feb. 9, 2015.

Lumedx CardioPACS 5.0 Web Viewer, Cardiopacs Module, 2 page color brochure, (506-10011 Rev A). Downloaded from http://cdn.medicexchange.com/images/whitepaper/cardiopacs_web_viewer.pdf?1295436926. Accessed on Feb. 9, 2015.

Lumedx Cardiovascular Information System, CardioPACS, one page in color printout. Accessed at http://www.lumedx..com/pacs.aspx. Accessed on Feb. 9, 2015.

McKesson Enterprise Medical Imagining and PACS | McKesson, 1 page (color) printout. Accessed at http://www.mckesson.com/providers/health-systems/diagnostic-imaging/enterprise-medical-imaging. Accessed on Feb. 9, 2015.

Medweb Radiology Workflow Solutions, Radiology Workflow Solutions, Complete Workflow & Flexible Turnkey Solutions, Web RIS/PACS with Advanced Viewer, 3 page color brochure, © 2006-2014 Medweb. Downloaded from http://www.medweb.com/docs/rispacs_brochure_2014.pdf. Accessed on Feb. 9, 2015.

Merge Radiology Solutions, Merge PACS, A real-time picture archiving communication system, (PAX-21990 rev 2.0), 2 page color brochure. Downloaded from http://www.merge.com/MergeHealthcare/media/documents/brochures/Merge_Pacs_web.pdf. Accessed on Feb. 9, 2015.

NOVARAD Enterprise Imaging Solutions, NOVOPACS, 2 page (color) printout. Accessed at http://ww1.novarad.net/novapacs. Accessed on Feb. 9, 2015.

PACSPLUS, PACSPLUS Server, 1 page (color) printout. Accessed at http://www.pacsplus.com/01_products/products_01.html. Accessed on Feb. 9, 2015.

PACSPLUS, PACSPLUS Workstation, 3 page (color) printout. Accessed at http://www.pacsplus.com/01_products/products_01.html. Accessed on Feb. 9, 2015.

Philips IntelliSpace PACS, in 2 color page printout. Accessed at https://www.healthcare.philips.com/main/products/healthcare_informatics/products/enterprise_imaging_informatics/isite_pacs. Accessed on Feb. 9, 2015.

RamSoft, RIS PACS Teleradiology, PowerServer PACS, Lite ACS, XU PACS Compare RamSoft PACS Products, 2 color page printout. Accessed at http://www.ramsoft.com/products/powerserver-pacs-overview. Accessed on Feb. 9, 2015.

Sage Intergy PACS | Product Summary. Enhancing Your Workflow by Delivering Web-based Diagnostic Images When and Where You Need Them, in 2 color pages. (IRV-SS-INTPACS-PSS-031309). © 2009 Sage Software Healcare, Inc. Downloaded from http://www.greenwayhealth.com/solutions/intergy/. Accessed on Feb. 9, 2015.

ScImage, Cardiology PACS, in 8 color page printout. Accessed at http://www.scimage.com/solutions/clinical-solutions/cardiology. Accessed on Feb. 9, 2015.

Sectra RIS PACS, in 2 color page printout. Accessed at https://www.sectra.com/medical/diagnostic_imaging/solutions/ris-pacs/. Accessed on Feb. 9, 2015.

Siemens syngo.plaza, Features and Benefits, in 2 color page printout. Accessed at http://www.healthcare.siemens.com/medical-maging-it/imaging-it-radiology-image-management-pacs/syngoplaza/features. Accessed on Feb. 9, 2015.

Simms | RIS and PACS Medical Imaging Software, in 2 color page printout. http://www.mysimms.com/ris-pacs.php. Accessed on Feb. 9, 2015.

Stryker, Imaging—OfficePACS Power Digital Imaging, in one color page printout. Accessed from http://www.stryker.com/emea/Solutions/Imaging/OfficePACSPowerDigitalImaging/index.htm. Accessed on Feb. 9, 2015.

Stryker, OfficePACS Power—Digital Imaging, 8 page color brochure, (MPP-022 Rev 4 BC/MP 300 Jan. 2007). © 2007 Stryker. Downloaded from http://www.stryker.com/emea/Solutions/Imaging/OfficePACSPowerDigitaiImaging/ssLINK/emea/1557/022268. Accessed on Feb. 9, 2015.

UltraRAD—ultra Vision, 1 page (color). Downloaded from http://www.ultraradcorp.com/pdf/UltraVISION.pdf. Accessed on Feb. 9, 2015.

VioStream for VitreaView, 2 color pages printout. Accessed at http://www.vitalimages.com/solutions/universal-viewing/viostream-for-vitreaview. Accessed on Feb. 9, 2015.

Visage Imaging Visage 7, 3 color page printout. Accessed at http://www.visageimaging.com/visage-7. Accessed on Feb. 9, 2015.

Viztek Radiology PACS Software Vixtek Opal-RAD, 4 color page printout. Accessed at http://viztek.net/products/opal-rad. Accessed on Feb. 9, 2015.

Voyager Imaging—Voyager PACS Radiologist Workstation, 2 page color brochure. Downloaded from http://www.intellirad.com.au/assets/Uploads/Voyager-PacsWorkstations.pdf?. Accessed on Feb. 9, 2015.

Voyager Imaging—Voyager PACS, 3 page color brochure. Downloaded from http://www.intellirad.com.au/index.php/assets/Uploads/Voyager-Pacs3.pdf. Accessed on Feb. 9, 2015.

Philips, IntelliSpace: Multi-modality tumor tracking application versus manual PACS methods, A time study for Response Evaluation Criteria in Solid Tumors (RECIST). 2012, Koninklijke Philips Electronics N.V., in four pages.

"LG Multi-Vision Display," Brochure, retrieved from http://www.networkspectrum.com/gsaschedule/Product%20Specifications/LG/Video%20Wall/60PJ10BUNDLE.pdf, last accessed Jul. 18, 2013.

* cited by examiner

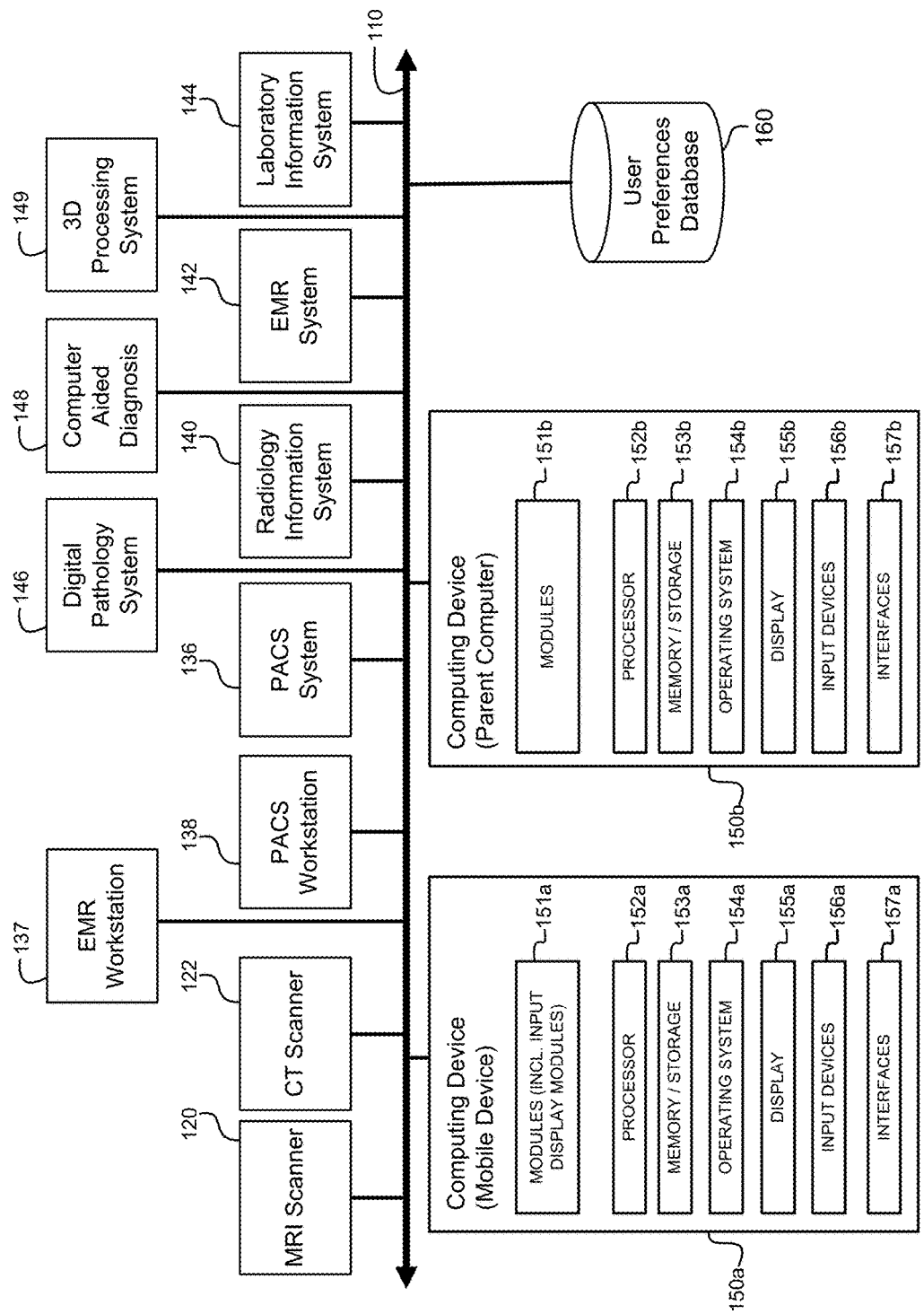

10,353,581 B1

MOBILE COMPUTER INPUT DEVICES

CROSS-REFERENCE TO RELATED APPLICATIONS

This application claims the benefit of priority under 35 U.S.C. § 119(e) of U.S. Provisional Application No. 61/676,575, filed Jul. 27, 2012, the disclosure of which is hereby incorporated by reference in its entirety.

This application is related to co-pending U.S. patent application Ser. No. 13/952,498, filed concurrently herewith, and titled "COMBINING ELECTRONIC DISPLAYS," which is hereby incorporated by reference in its entirety.

BACKGROUND

Efficiently interacting with computing systems to access various types of information may be challenging or impossible with existing, traditional, input devices and methods. Additional challenges exist when different users desire to interact with the same computing system using different types of input devices or methods.

SUMMARY

In one embodiment, a mobile electronic device comprises a computer readable medium storing software modules including computer executable instructions and one or more hardware processors in communication with the computer readable medium, and configured to execute one or more input display modules of the software modules in order to communicate with an associated parent computing system in order to send information to and receive information from the parent computing system, identify a user of the mobile electronic device, access input display data associated with the user, customize an interface of the mobile electronic device based at least in part on the accessed input display data, display the customized interface on the mobile electronic device, receive user inputs via the customized interface of the mobile electronic device; and in response to the received user inputs, display, at the mobile electronic device, information received from the associated parent computing system and/or provide inputs to the associated parent computing system, wherein information displayed on a display of the associated parent computing system is updated in response to inputs provided to the associated parent computing system.

In one embodiment, a computer-implemented method (as implemented by one or more computer systems comprising computer hardware and memory, the one or more computer systems configured with specific executable instructions), comprises identifying a user of a mobile electronic device in communication with a parent computing system, accessing input display data associated with the user, customizing an interface of the mobile electronic device based at least in part on the accessed input display data, receiving user inputs via the customized interface of the mobile electronic device, and in response to the received user inputs, displaying, at the mobile electronic device, information received from the parent computing system and/or provide inputs to the parent computing system, wherein information displayed on a display of the parent computing system is updated in response to inputs provided to the parent computing system.

In one embodiment, a computer-implemented method (as implemented by one or more computer systems comprising computer hardware and memory, the one or more computer systems configured with specific executable instructions), comprises: detecting a tilt angle of a display associated with at least one of the one or more computer systems, and customizing a user interface displayed on the display based at least in part on the detected tilt angle of the display.

In one embodiment, a mobile computing device comprises one or more hardware processors, one or more storage devices storing software code configured for execution by the one or more hardware processors in order to communicate with a parent computer, customize a user interface displayed on the mobile device based on at least one or more of user/group/site preferences, mobile device characteristics, parent computer characteristics, or software used on the parent computer, detect input by the user to the mobile device, the input received via one or more of a touch screen, device button, gyroscope, accelerometer, camera, microphone, or fingerprint reader integrated into or in communication with the mobile device, and in response to detecting user input, transmit information associated with the detected user input to the parent computer.

BRIEF DESCRIPTION OF THE DRAWINGS

FIG. 10 is a system diagram showing various example components of a system in which a mobile computing device functions as an input device for various parent computing systems, according to various embodiments of the present disclosure.

DETAILED DESCRIPTION

Figure 1:
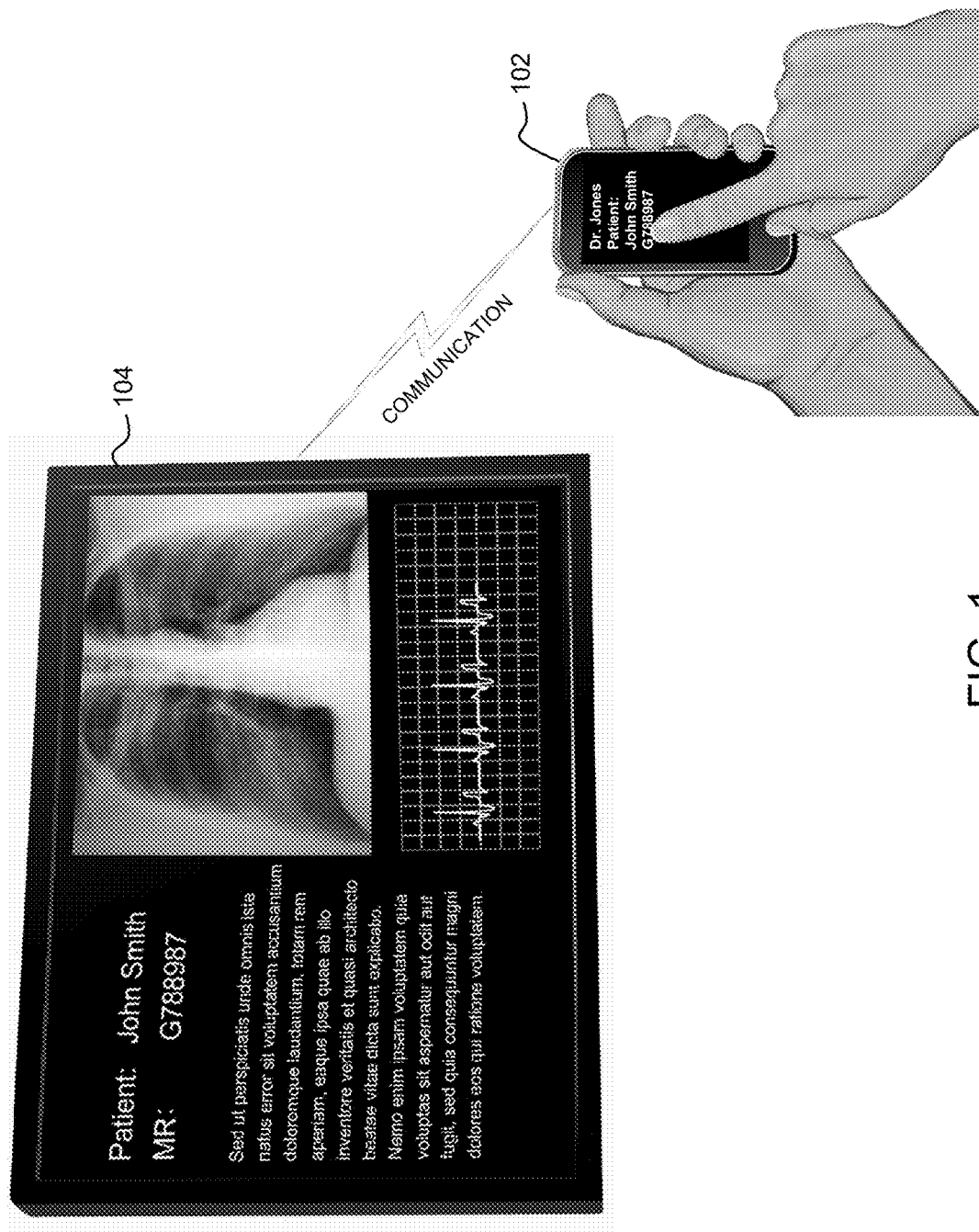
FIG. 1 illustrates a mobile computing device communicating with a parent computing system, according to an embodiment of the present disclosure.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Within the present disclosure, the terms "mobile computing device," "mobile computer device," "mobile device," and the like may be used interchangeably to refer to any computing device, such as computing device 150a (see discussion of FIG. 10 below), that provides for display to, and/or input from, a user. Examples of mobile devices that may be used in the systems and methods of the present disclosure include, but are not limited to, handheld devices (such as a notebook computers, tablet computers, personal digital assistants (PDAs), hybrid PDA/mobile phones, mobile phones, smartphones, electronic book readers, and/or digital media players), gaming devices, and/or integrated component(s) for inclusion in other devices, among others. For ease of description, the systems and methods described herein are discussed with reference to a tablet or smartphone mobile device; however, any other type of mobile device may be used.

Further, within the present disclosure, the terms "parent computing system," "parent system," "parent computing device," "parent computer," "server computer," "workstation," desktop computer," and the like may be used interchangeably to refer to any computing device, such as computing device 150b (see discussion of FIG. 10 below), that communicates with a mobile computing device. Examples of parent computing systems that may be used in the systems and methods of the present disclosure include, but are not limited to, general purpose computing systems, desktop computers, server computers, one or more mobile computers, and/or special purpose computing systems (such as a picture archiving and communication system (PACS) or electronic medical record system (EMR)), among others. For ease of description, the systems and methods described herein are discussed with reference to a mobile device that is used as an input device to, or is in communication with, a PACS or EMR; however, the mobile device may be used as an input device to any other type of parent computer. For example, the systems and methods discussed herein may be useful for other medical applications or outside of the medical environment for any user that wishes to customize the controls of a computing device and displayed software.

Introduction

Disclosed herein are systems and methods for the use of mobile computing devices, such as tablets and/or smartphones, as user-customizable input devices that interface with more sophisticated computer systems (or "parent computing systems"), such as PACS or EMRs. The systems and methods described below may enable significantly greater functionality, flexibility, customizability, safety, and efficiency than is achievable using current input methods.

For example, when users (such as radiologists) currently view images on a PACS, they use a variety of input devices such as keyboards, mouses, gaming mouses, gaming pads, microphones, headsets, and/or boom microphones. Many PACS and EMRs currently enable users to employ keyboard or mouse features to select and/or employ functions or tools, such as magnify, roam, page, window/level, display documents, display prior reports, reorient images, etc. A user may also be allowed to customize various keyboard shortcuts or mouse functions, or use a touch screen, to move images. However, these input methods may not be ideal in various circumstances. For example, a mouse, keyboard, gaming pad, and/or microphone may not provide a desired customizability. Different users may desire different functionality or customization of their keyboard, for example, when they interact with a PACS or EMR. Changing the functionality may be time consuming or cumbersome. Further, these input devices may create an unsanitary environment as such input devices may be used by many users of a PACS or EMR.

Described herein are systems and methods that overcome these deficiencies and disadvantages, among others not explicitly mentioned. In an embodiment, a mobile computing device, such as a tablet computing device, may be used as an input device that controls another computing device, such as a desktop, server, and/or workstation computing device (such as a PACS or EMR) that has increased processing power over the mobile computing device. Advantageously, the mobile computing device may be customized for a particular user and/or for interaction with a particular workstation. Additionally, the mobile device may provide input and/or display capabilities that were not previously available at the workstation including, for example, a touchscreen, an audio input, scanning and/or photo-taking capabilities, among others. Further, each user of such systems and methods may use a unique mobile computing device as an input to a workstation, thereby preventing the spread of infection or other unsanitary conditions.

In one embodiment, the tablet may display a modifiable image that simulates a standard QWERTY keyboard. The user may employ a graphical user interface to customize the input display, such as a virtual keyboard. In one embodiment, the input display characteristics (e.g., layout of keys of a virtual keyboard and functions associated with those keys) are associated with a particular user (or group of user) and stored for later use by the user with various computing devices. For example, user preferences may be provided by individual users such that the individual user preferences (such as custom input displays) may be automatically accessed by a PACS or EMR (or other computing system) when the PACS or EMR detects a particular individual. Detection of a particular user may be accomplished, for example, by detecting a tablet that belongs to a particular individual (or a particular individual has logged in to) and/or receiving login information of a user at the PACS or EMR (for example, a login/password, biometric data, or a video-detected gesture that identifies a particular individual).

In various embodiments, storage of the user's keyboard (or other input type) customization may be local, and/or may be stored on another computer in a local area network, wide area network, or cloud accessible by the PACS, EMR, and/or workstation. In this embodiment, any tablet used by the user to interface with any server may be configured automatically to include the user's keyboard customizations, whether or not the user had used the server or tablet previously. Alternatively, keyboard customizations may be stored on the tablet so that a user that has custom input display(s) stored on his tablet may walk up to another workstation, attach the tablet via a USB or other method (including wireless methods) and the customizations available on the tablet may be employed to control the program running on that computer.

In another example embodiment, a user authenticates with the network and initiates communication with a parent computer. The user's mobile device may retrieve his user preferences from a User Preferences Database 160 (see FIG. 1) stored on a server on the network. A user interface presented to the user based on his preferences could include, for example, icons to launch PACS, EHR, and LAB applications on the parent computer. Touching the PACS icon on the mobile device may launch the PACS application on the parent computer and change the user interface on the mobile device to one customized for that application. For example, the user's preferences could indicate that if there is an accelerometer present on the mobile device, then a "Tilt Navigate" button should be displayed. In PACS, touching the Tilt Navigate icon on the mobile device and simultaneously tilting the device would allow the user to navigate through images within the PACS application displayed on the parent computer. In this case, requiring the user to touch the Tile Navigate icon to use this tilt mode avoids the requirement that the user hold the device steady if he is navigating through images in some other manner, such as using multitouch input, for example.

Further described herein are systems and methods of detecting the tilt angle of a display of a desktop and/or workstation computer, and providing input to the desktop and/or workstation computer based on the tilt angle of the display. In various embodiments the display of a desktop and/or workstation computer may include tilt angle detecting capabilities. The tilt angle of the display may be used directly as an input to the computer. Alternatively, the tilt angle of the display may be used to configure and/or optimize input methods available to a user of the computer.

Depending on the embodiment, the methods described with reference to the flowcharts, as well as any other methods discussed herein, may include fewer or additional blocks and/or the blocks may be performed in a different order than is illustrated. Software code configured for execution on a computing device in order to perform the methods may be provided on a tangible computer readable medium, such as a compact disc, digital video disc, flash drive, hard drive, memory device or any other tangible medium. Such software code may be stored, partially or fully, on a memory of a computing device (e.g., RAM, ROM, etc.), such as the computing devices 150a or 150b (see discussion of FIG. 10 below), and/or other computing devices illustrated in the figures, in order to perform the respective methods.

Mobile Device as an Input to a Parent Computing System

FIG. 1 illustrates a mobile computing device (for example, smartphone 102) communicating with a parent computing system 104 (for example, a PACS or EMR), according to an embodiment of the present disclosure. In the embodiment of FIG. 1, the smartphone 102 is in communication with the parent computing system 104. Similar to the discussion below with reference to mobile device 150a and parent computer 150b in reference to FIG. 10, the smartphone 102 (one example of a mobile device 150a) may communicate with the parent computing system 104 (one example of a parent computer 150b) over a wireless or wired connection. As is further described in detail below in reference to FIG. 10, the smartphone 102 and the parent computing system 104 each include various components and modules that provide the functionality described.

In operation, the smartphone 102 may be paired with the parent computing system 104 and may receive information from, and/or provide information to, the parent computing system 104. Communication between the smartphone 102 and the parent computing system 104 may be established, for example, when the smartphone 102 is brought into proximity with the computing system 104. In an embodiment, the parent computing system 104 may identify the smartphone 102 and/or a user of the smartphone 102. The identity of the smartphone 102 and/or the user may be used to customize the interface, input methods, information displayed, and/or other elements of the smartphone 102. The identity of the smartphone 102 and/or the user may be further used to customize the interface, input methods received, information displayed, and/or other elements of the parent computing system 104. In an embodiment, a user is identified by logging in (for example, providing a username and password, or other unique identifier) to the parent computing system 104 via the smartphone 102. Alternatively, the user may be logged in to the smartphone 102, or a software application operating on the smartphone 102, and the user may be identified via communication between the smartphone 102 and parent computing system 104.

In the example of FIG. 1, a user is operating the smartphone 102 to manipulate the view and/or interactions with information displayed on the parent computing system 104 and to provide input to the parent computing system 104. The user has selected to view information related to a particular patient, John Smith, by selecting the patient on the smartphone 102. In response, the parent computing system 104 accesses and displays various information related to patient John Smith, including text, images, graphs, among other items of information. The user may optionally view the information directly on the smartphone 102. In an embodiment, information viewed on the smartphone 102 may be optimized for the smaller display of the smartphone 102, while information viewed on parent computing system 104 may be optimized for the larger display of the parent computing system 104. Thus, in some embodiments the same (or similar) information, such as a medical image, may be viewed in different formats (e.g., different resolutions, filtering, orientation, window levels, etc.) on the computing system 104 and the smartphone 102.

As explained above, the user of the smartphone 102 may view and interact with the parent computing system 104 without the use of a directly connected, or dedicated, keyboard or mouse. The smartphone 102 may provide additional input capabilities to the parent computing system 104 that were not previously available including, for example, a touchscreen input, an audio input, and/or scanning or phototaking capabilities, among others.

Figure 2:
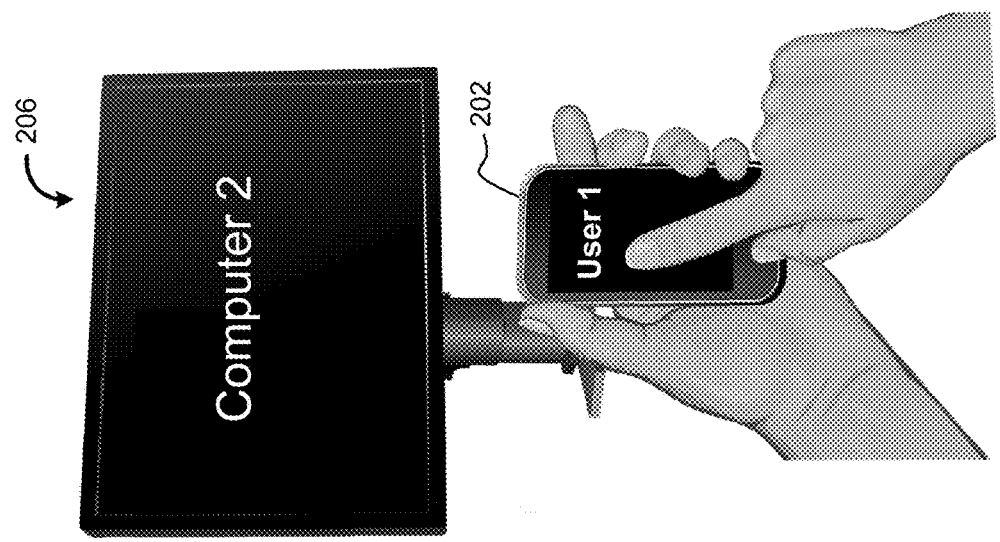
FIG. 2 illustrates a mobile computing device of a user communicating with multiple parent computing systems, according to an embodiment of the present disclosure.
Figure 2:
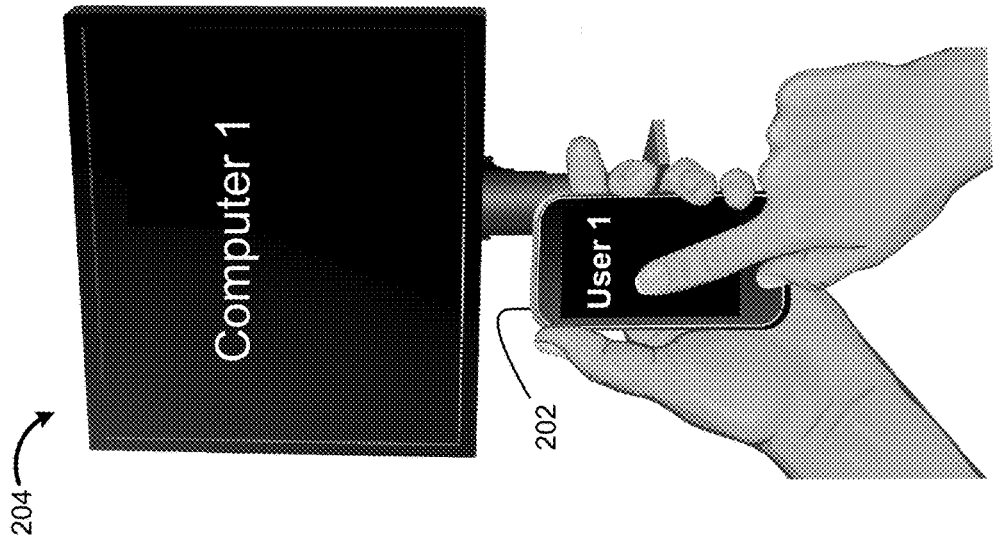

FIG. 2 illustrates a mobile computing device (smartphone 202) of a user communicating with multiple parent computing systems (including parent computing system 204 and parent computing system 206) (for example, PACS and/or EMRs), according to an embodiment of the present disclosure. As with FIG. 1, the smartphone 202 may communicate with either the parent computing system 204 or the parent computing system 206 wirelessly or over a wired connection.

In operation, parent computing system 204 and parent computing system 206 may be different systems, may provide different information, may have access to different databases, may have different interfaces, and/or may be configured to receive different types of inputs, among other differences. The user of the smartphone 202, however, may interact with each of the parent computing systems 204, 206 at different times or concurrently. For example, the user ("user 1") may begin communication with, provide input to, and/or otherwise interact with parent communicating system 204 ("computer 1") via the smartphone 202 at a particular time, while at a later time may begin communication with, provide input to, and/or otherwise interact with parent communicating system 206 ("computer 2") via the same smartphone 202.

In an embodiment, the behavior and functionality of smartphone 202 may vary based on the characteristics of the particular parent computing system with which the smartphone is interacting. For example, when the parent computing system comprises a PACS, the smartphone 202 may automatically provide a touch interface optimized for navigating and examining medical images. On the other hand, when the parent computing system comprises a text-based system (such as an EMR), the smartphone 202 may provide a keyboard interface optimized for text input. Various other customizations to the information displayed and/or interface of the mobile computing device may be configured and/or otherwise implemented based on the characteristics of the parent computing device, among other parameters. In various embodiments, and as described below, the information displayed on and/or the interface of the mobile computing device may be customized based on the identity of the user of the mobile computing device. For example, the user may specify a particular keyboard layout, particular touch gestures, particular voice commands, and/or other input or display customizations. Further, in an embodiment, the interface of and/or information displayed on the mobile computing device may be customized based on any combination of the identity of the user, the characteristics of the parent computing system, the characteristics of the mobile computing device, the identity of a user group, user group preferences, default preferences, and/or site preferences. As discussed elsewhere, the keyboard layout provided to the mobile device of the user may be customized (e.g., automatically selected by the mobile device) based on one or more of many other parameters, such as the users location (e.g., home or medical facility), computing capabilities of the mobile computing device (e.g., screen size, input devices, processing speed and/or memory available), time of day, week, year (e.g., work hours or evenings), characteristics of the data being viewed (e.g., modality of an exam, keywords and exam report, patient characteristics, etc.), and any other characteristics. As discussed further below, the keyboard layout may be selected based on user roles for selection of a particular keyboard layout (or generation of a unique keyboard layout in some embodiments) based on rules that are established by the user, a user group, site, default and/or administrative function.

Figure 3:
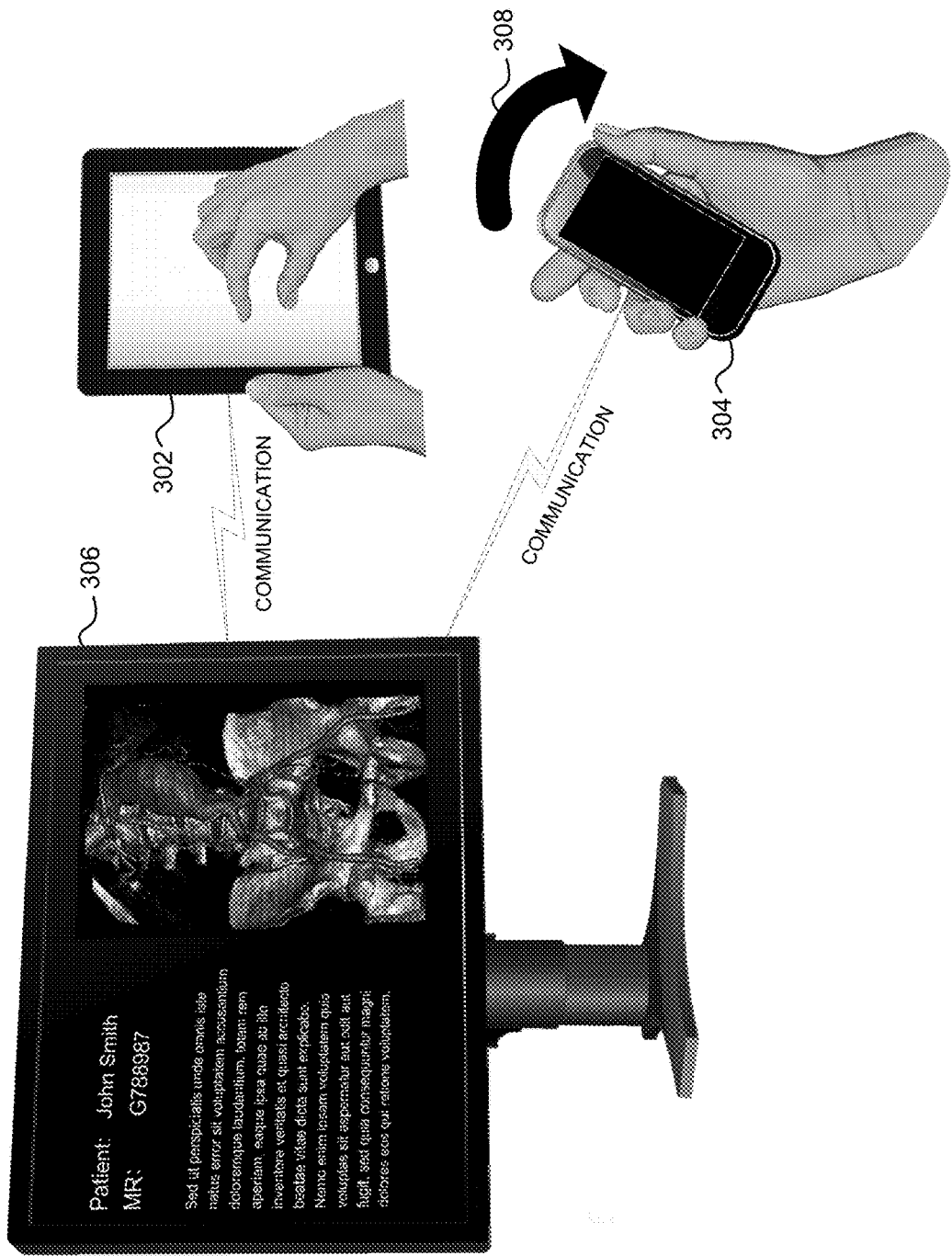
FIG. 3 illustrates multiple mobile computing devices communicating with a parent computing system, according to an embodiment of the present disclosure.

FIG. 3 illustrates multiple mobile devices (302, 304) communicating with a parent computing system 306, according to an embodiment of the present disclosure. As with FIG. 1, the mobile computing devices 302, 304 may communicate with the parent computing system 306 wirelessly or over a wired connection.

In operation, the interface, operation, and/or behavior of each of mobile devices 302, 304 may vary based on the characteristics of the respective mobile devices 302, 304. The characteristics of the mobile devices may include, for example, the technical specifications of the mobile device, including a screen size, available input methods, and available input sensors, among others. In the example of FIG. 3, tablet 302 includes multitouch input capabilities. For example, a user using tablet 302 to interact with parent computing system 306 may use multitouch gestures, such as pinch-to-zoom, to interact with various aspects of the parent computing system 306. This is because the tablet 302 includes multitouch input capabilities. In another example, a user using smartphone 304 to interact with parent computing system 306 may use the motion and/or tilt of the smartphone 304 (as indicated by arrow 308) to interact with various aspects of the parent computing system 306. This is because smartphone 304 includes an accelerometer and/or gyroscope that may be used to detect the motion and tilt of the smartphone. In various other embodiments, other characteristics and/or technical specification of each mobile computing device communicating with a parent computing system may be used to determine how a the mobile computing device is customized and/or the ways in which a user may interact with the parent computing system.

Figure 4:
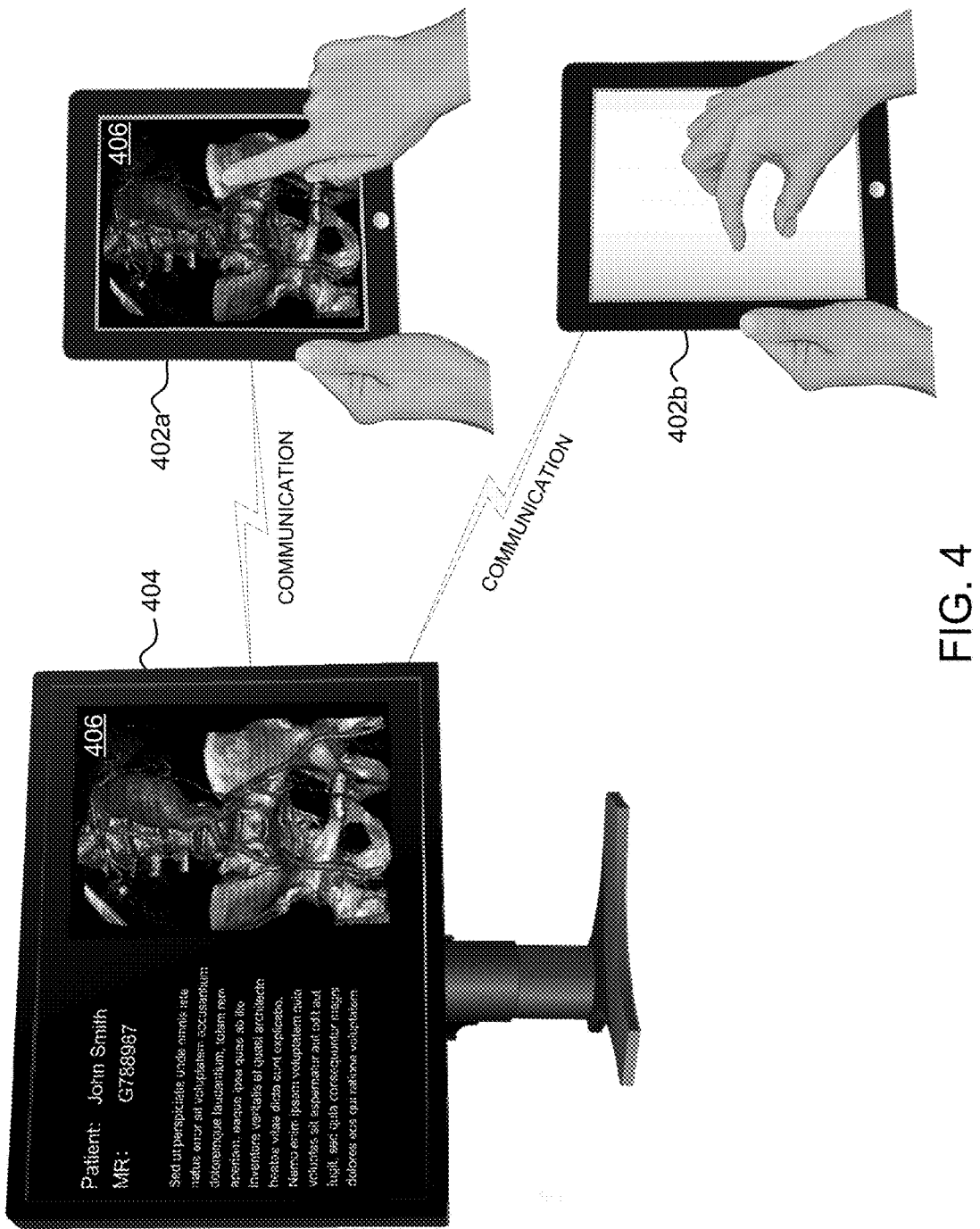
FIG. 4 illustrates a mobile computing device communicating with a parent computing system in which the mobile computing device is configurable to enable input from, and/or display to, a user, according to embodiments of the present disclosure.

FIG. 4 illustrates a mobile device 402 (shown as both 402a and 402b to illustrate different features) communicating with a parent computing system 404 in which the mobile computing device is configurable to enable input from, and/or display to, a user, according to embodiments of the present disclosure. As with FIG. 1, the mobile computing device 402a, 402b may communicate with the parent computing system 404 wirelessly or over a wired connection.

In operation, the mobile computing device of FIG. 4 may communicate with the parent computing system 404 to enable display of information from, and/or provide input to, the parent computing system 404. In a first example, the mobile computing device 402a is configured to both display information (in this example, images) from the parent computing system 404, and provide user input to the parent computing system 404. This is shown as the image 406 is displayed on both the parent computing system 404 and the mobile computing device 402a, and as the user manipulates the image 406 on the mobile computing device 402a via touch input. In a second example, the same mobile computing device 402b is configured to receive user input (in this example, touch input) without displaying data that is on the parent computing system 404, and provide that user input to the parent computing system 404. Thus, in various embodiments, the mobile computing device may be configured to display information, receive input, transmit input to a parent computing system, or any combination other these.

In various embodiments, a user input to a mobile computing device may or may not cause changes on a parent computing device. For example, a mobile computing device may be configured to display images to a user, and allow the user to view, pan, rotate, zoom, and/or otherwise manipulate the images on the mobile computing device without changing the display of the same (and/or other) images displayed on the parent computing system. In another example, the user's input to the mobile computing device may cause the image displayed on the mobile computing device to also be manipulated as displayed on the parent computing system. In another example, a user may provide annotations, manipulations, and/or other input at the mobile computing device which may be updated simultaneously on the parent computing system, or may be updated at a later time on the parent computing system. In this example, a user may provide input on the mobile computing device, and then choose to save the input, at which point the input may be communicated to the parent computing system.

In various embodiments, the information displayed on the mobile computing device may differ from the information displayed on the parent computing system. For example, information shown on the mobile computing device may supplement the information shown on the parent computing system. In another example, the information shown on the mobile computing device may be optimized for the display size of the mobile computing device. In another example, when a mobile computing device begins communication with a parent computing system, the display of the mobile computing device may serve as an expanded display space for information previously shown on the parent computing system. In this example, some information may be transferred to the display of the mobile computing device, allowing additional space on the display of the parent computing system to expand the information displayed, and/or provide additional information. In an embodiment, the user of the mobile computing device may select specific items of information to be displayed on the display of the mobile computing device.

In various embodiments, the information displayed on the mobile computing device, and/or the inputs communicated from the mobile computing device, may pass through one or more intermediate computing systems. For example, a three-dimensional (3D) rendering computer server may receive image information from the parent computing system, render the image information into a 3D image (which may or may not be manipulable by the user), and then communicate the 3D image to the mobile computing device. The mobile computing device may then display the 3D image and/or receive inputs from the user on the 3D image. Some inputs from the user may be communicated to the 3D rendering computing server (for example, manipulations to the 3D image) which may then be communicated to the parent computing system, while other inputs may be directly communicated to the parent computing system (for example, text inputs to a patient record). While a 3D rendering computer server is one example, other types of intermediate computing systems may also be implemented.

Customized Mobile Device Input Displays

Figure 5A:
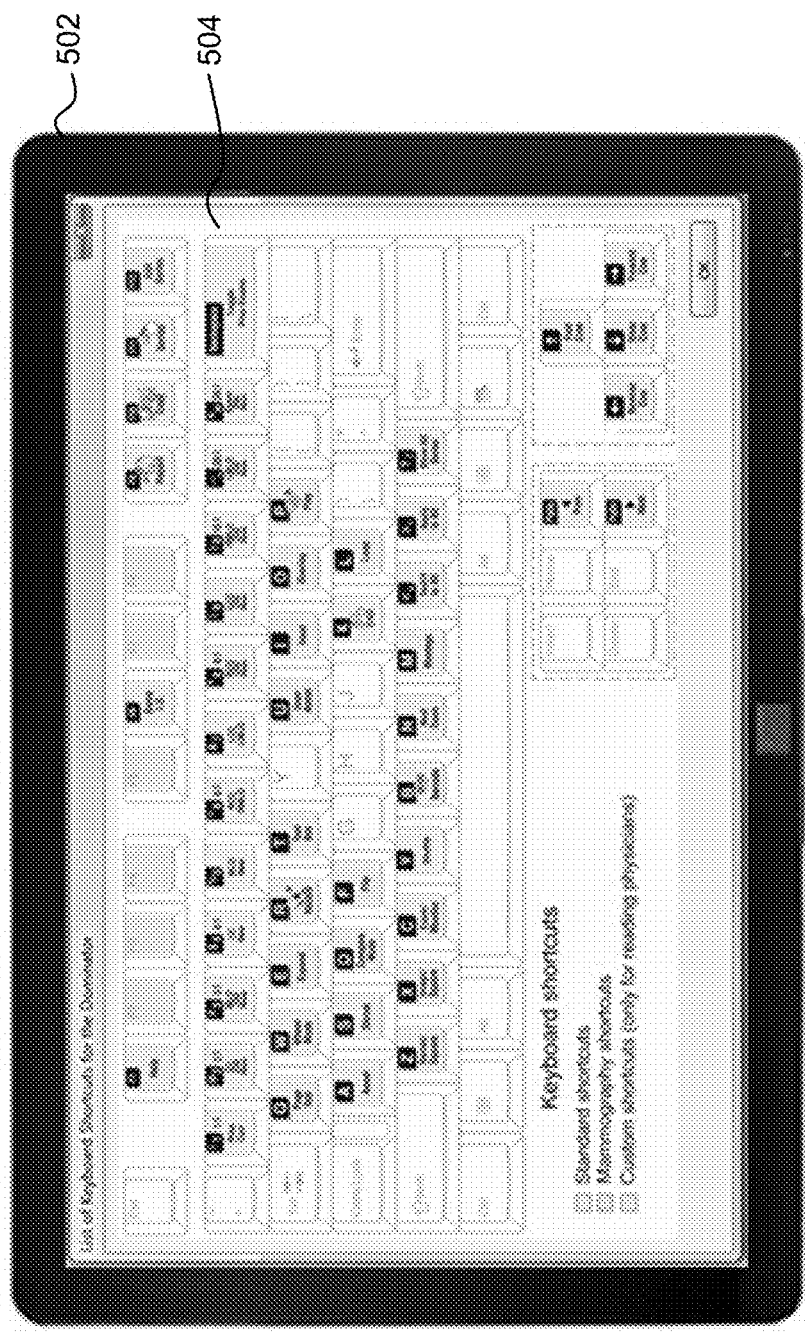
FIGS. 5A-5C illustrate a mobile computing device with custom input and/or display functionality, according to embodiments of the present disclosure.
Figure 5B:
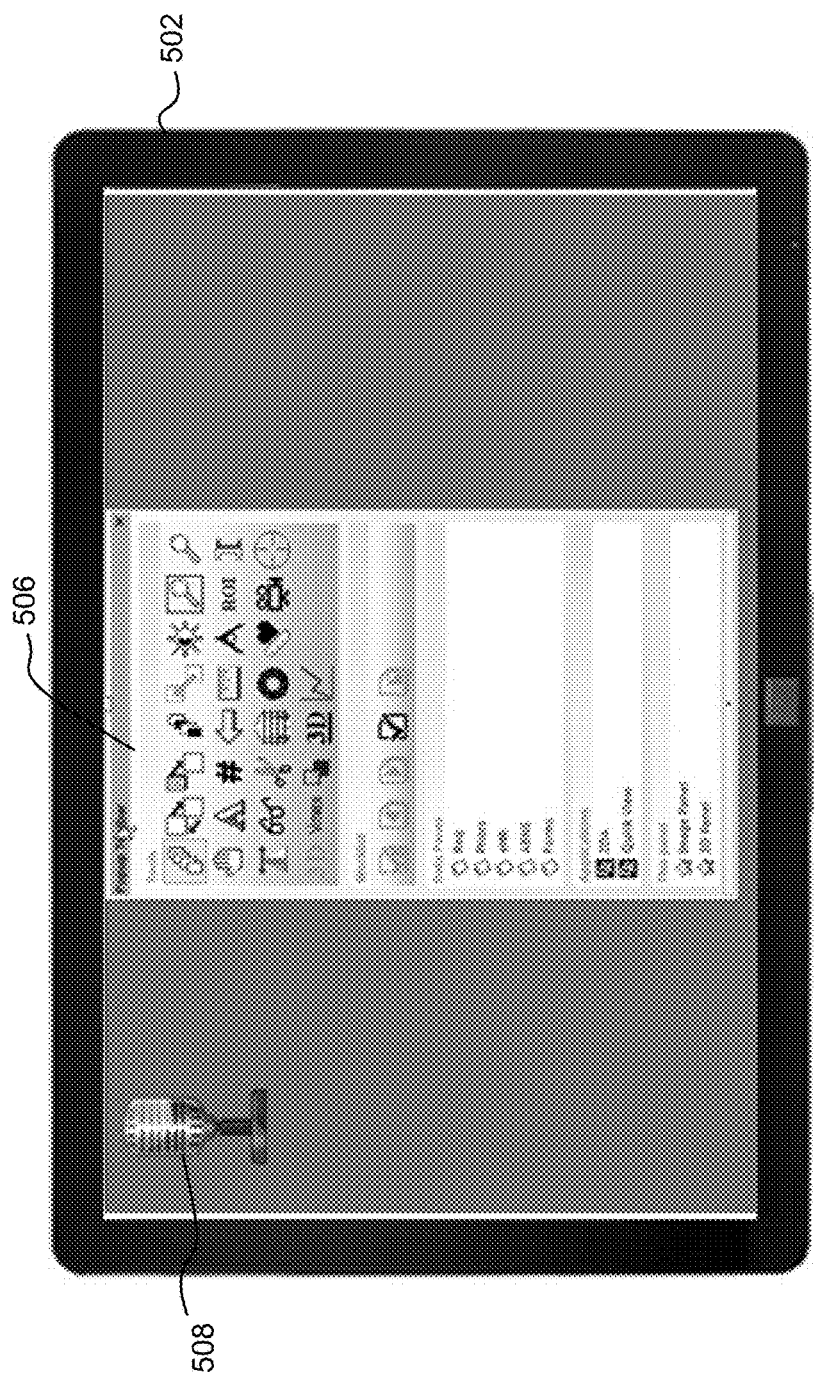
Figure 5C:
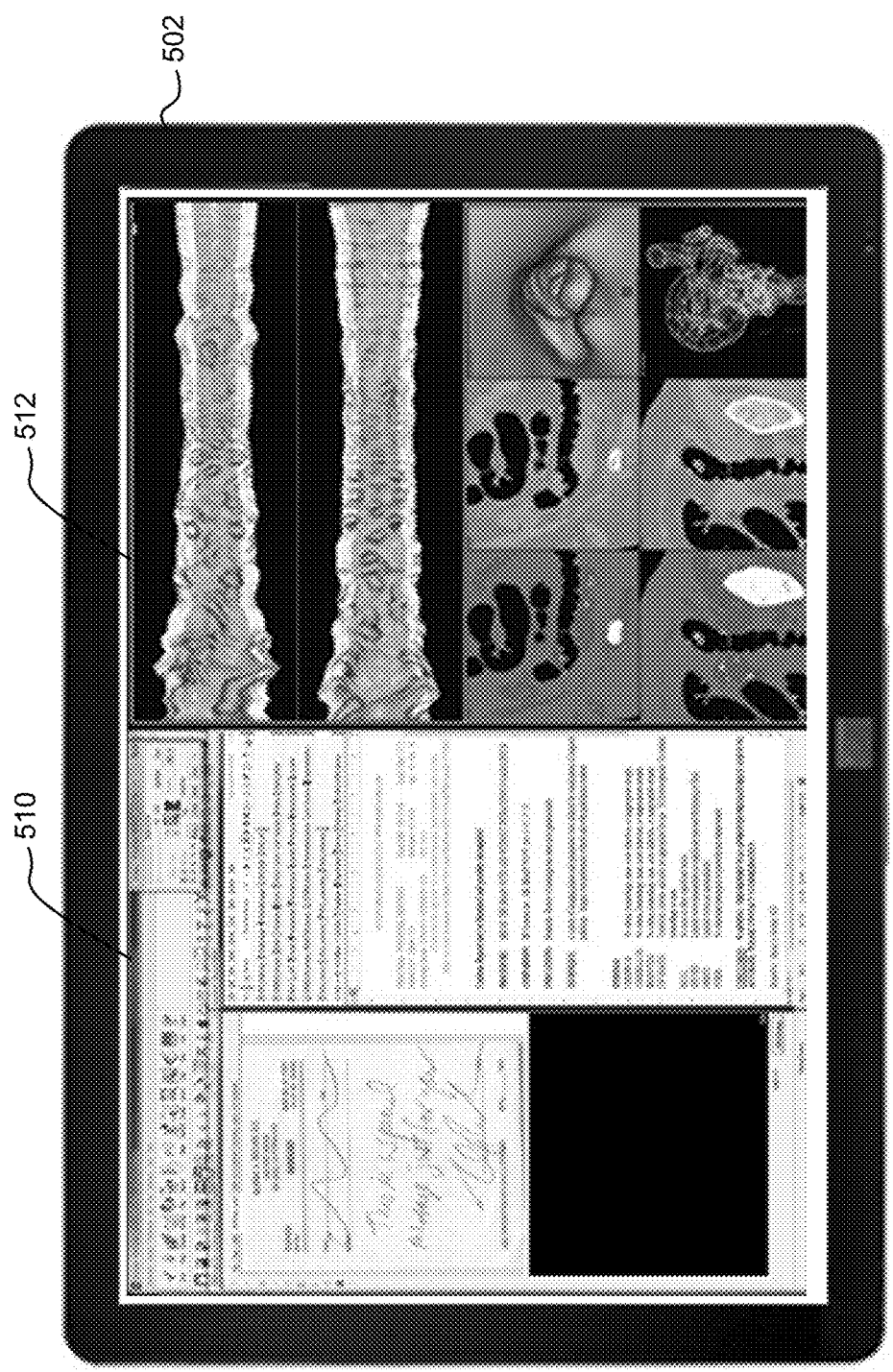

FIGS. 5A-5C illustrate a mobile computing device (tablet 502) with custom input and/or display functionality, according to embodiments of the present disclosure. As mentioned above, the display and/or inputs of a mobile computing device may be configured and/or customized based on the identity of a particular user, characteristics of a particular mobile computing device and/or parent computing system, characteristics of the information displayed, and/or any other related characteristic discussed herein. As described below, various types of inputs and information displays may be available and customizable by a user or automatically customizable by the mobile computing device and/or parent computing system.

FIG. 5A illustrates the tablet 502 with a custom input display in the form of a customized virtual keyboard 504. In an embodiment, the user is able to customize actions associated with keys of the virtual keyboard that are laid out in a basic QWERTY format. For example, after entering a programming mode, the user can select a button for programming, indicate the function to be performed by the selected button when pressed, and indicate that the programming of the button is complete. When the user goes back into a use mode, the programmed button performs the user defined function for the button when pressed. Although the layout shown in FIG. 5A includes a generally QWERTY layout, because the keyboard is not physical, the position of the keys may be changed into any other layout. For example, in one embodiment the user can drag and release buttons to different locations on the virtual keyboard as desired, as well as add or remove buttons from the input display.

In addition to the example of the QWERTY input display discussed above, a software program may enable other customizations, such as adding buttons, virtual dials, tools, or other devices that can be employed as user input controls. Such other input controls may be added to an input display that also includes a virtual keyboard and/or may be included on a separate input display. In one embodiment, the user can swipe the tablet or employ other input means to select or switch between multiple input displays. For example, a user can quickly change between the input display of FIG. 5A and another input display that uses an entirely different configuration and possibly has different functions available through the input controls on that input display (e.g., see discussion of FIG. 6 below).

Different input displays may be useful for different tasks, such that a user can more efficiently perform the first task using a first input display (for example, having a first keyboard layout and first set of associated commands) and then quickly change to a second input display (for example, having a second keyboard layout and second set of associated commands) in order to more effectively perform a second task. In one embodiment, the user may customize the proximity, size, or order in which the input displays appear, such as in response to a predefined user input.

In one embodiment, multiple input displays may be accessible in a predefined order in response to left/right (or up/down) swiping (or other user input, such as tilting of the device or voice commands) by the user on the tablet screen. For example, the user may swipe the input display of FIG. 5A in order to be presented with the input display of FIG. 5B. The user may customize the content of each input display and how to access additional customized input displays. Thus, the user may customize the number of input displays, which appears first by default, whether the images are ordered left to right (or vice versa) or top to bottom (or vice versa), or the sequence if there are more than two such input displays. This example is not intended to limit the number or scope of customizations that a user can create and store.

In addition, the tablet 502 may show an input display that is a depiction, or replica display, of the display on the attached or parent computer system. For example, a replica display may include a reduced resolution snapshot of a parent computer system, such as a PACS display. In embodiments where the parent computer system, for example, the PACS or EMR, uses multiple monitors, the user may define multiple replica displays that each depict a respective monitor or portion of a monitor.

In the example of FIG. 5B, the input display includes a replica display 506 and a control for a microphone (microphone icon 508) (either built into the tablet or a separate microphone). The input display could also include a virtual keyboard and/or any other input controls. In this embodiment, the user can turn the microphone off and on by touching the microphone icon 508. Additionally, the tablet displays the replica display 506 depicting a menu that may appear on the PACS, such that the user has full access to commands available on the PACs through the tablet 502. By touching the tablet, the user may control the display on the attached computer system, whether the system employs one or many monitors. Thus, in one embodiment the user can control the PACS by interacting with a replica display on the tablet. For example, the user may drag any image to another location, or rearrange the display of the images and documents, or remove the display of an image or document.

FIG. 5C illustrates a sample replica display on the tablet 502, where the replica display corresponds with one or more displays of a PACS, such as PACS 510 and/or PACS 512. As noted above, the user can manipulate the position (and other characteristics) of the windows using commands provided on the tablet 502, such as multitouch input commands. In this way, the user can interface and control all available features of the PACS software without actually executing the PACS software on the tablet.

In addition to touching, other means of input may be customized, such as audio input, input from bar-coding devices, or other devices that may be peripheral to the tablet.

Figure 6:
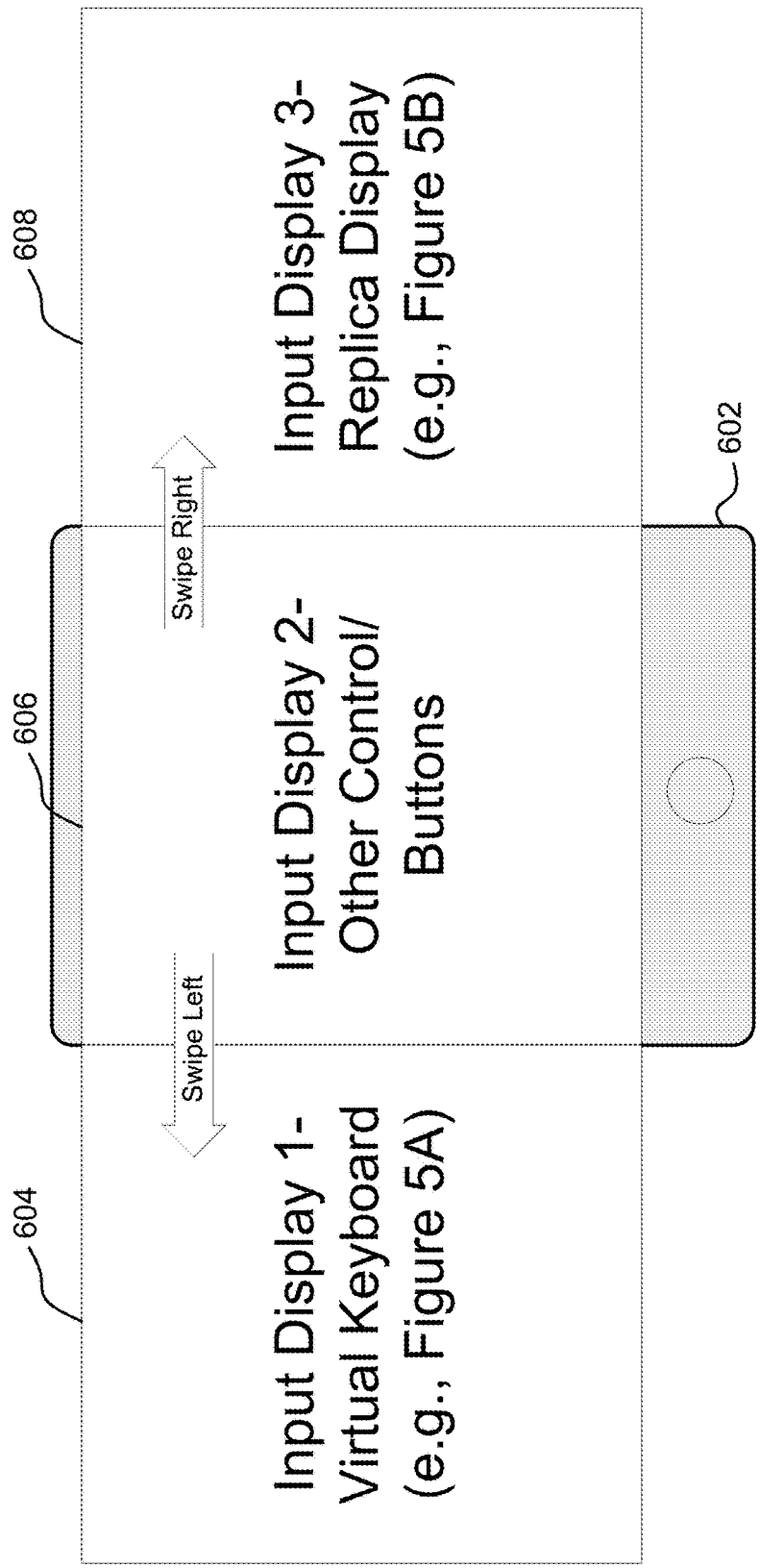
FIG. 6 illustrates a mobile computing device having multiple changeable input and/or display options, according to an embodiment of the present disclosure.

FIG. 6 illustrates a mobile computing device (tablet 602) having multiple changeable input and/or display options, according to an embodiment of the present disclosure. The sample layout of input displays illustrated in FIG. 6 may be user configured and accessible via user inputs. In the example of FIG. 6, the tablet 602 is shown with input display 2 (606) currently displayed. Input display 2 could be any type of custom or preprogrammed input display, but in this example is an input display with various user defined controls and buttons, such as controls and buttons that may be used for a specialized purpose. In this embodiment, the user has configured the input displays such that a swipe to the right would cause input display 1 (604), for example, a virtual keyboard, to be displayed. Likewise, a swipe to the left (with input display 2 displayed) causes input display 3 (608), for example, a replica display of some or all of the display of the PACS, to be displayed. In one embodiment, the user can easily reconfigure the arrangement of the various input displays and adjust the input commands that are used to move between the various input displays. For example, a series of input displays including four or more input displays may be generated and the input displays may be accessed using screen touch gestures.

Example Methods

Figure 7A:
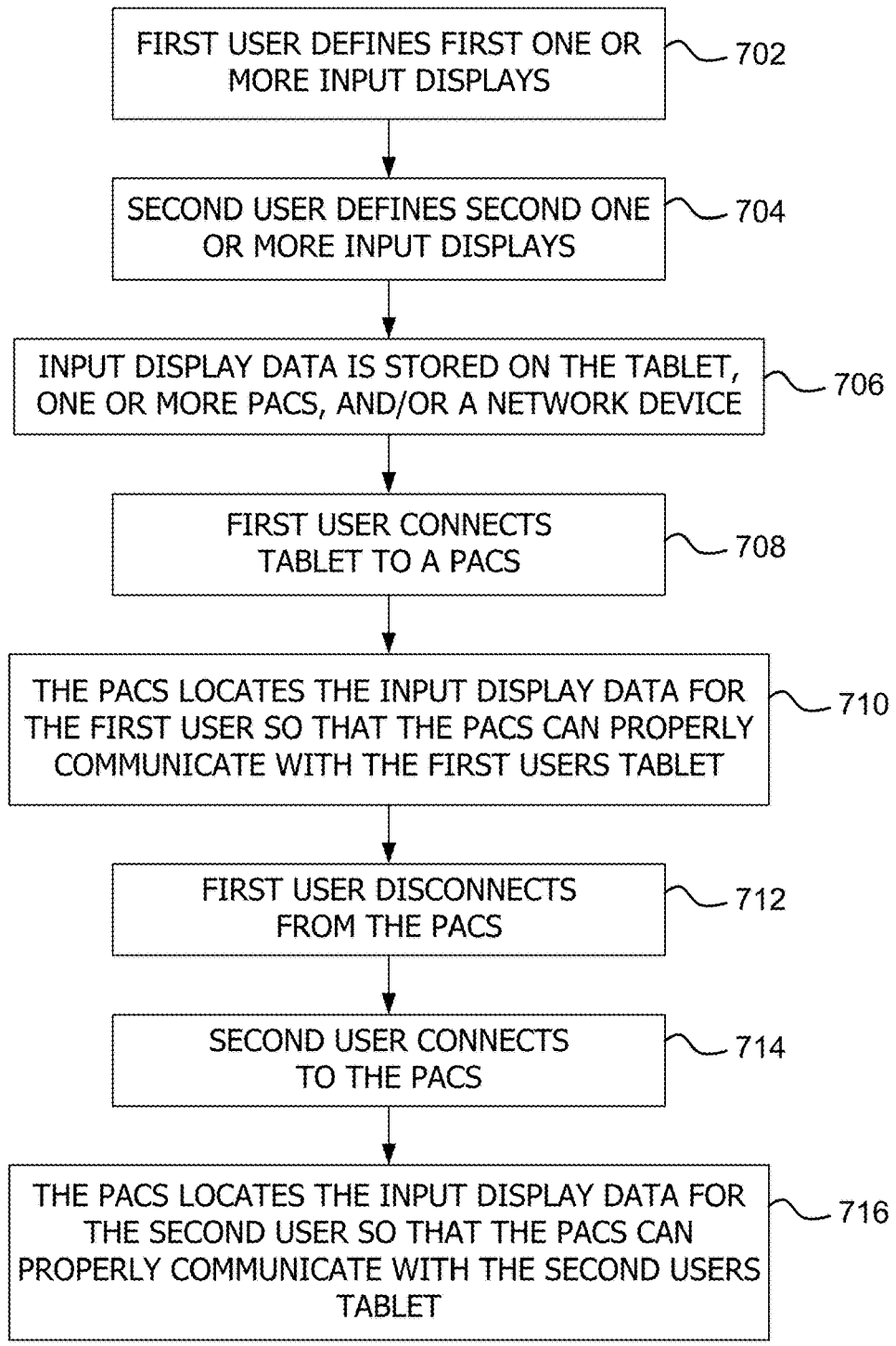
FIGS. 7A-7C are flowcharts depicting illustrative operations of a system for allowing a mobile computing device function as an input device for a parent computing system, according to embodiments of the present disclosure.
Figure 7B:
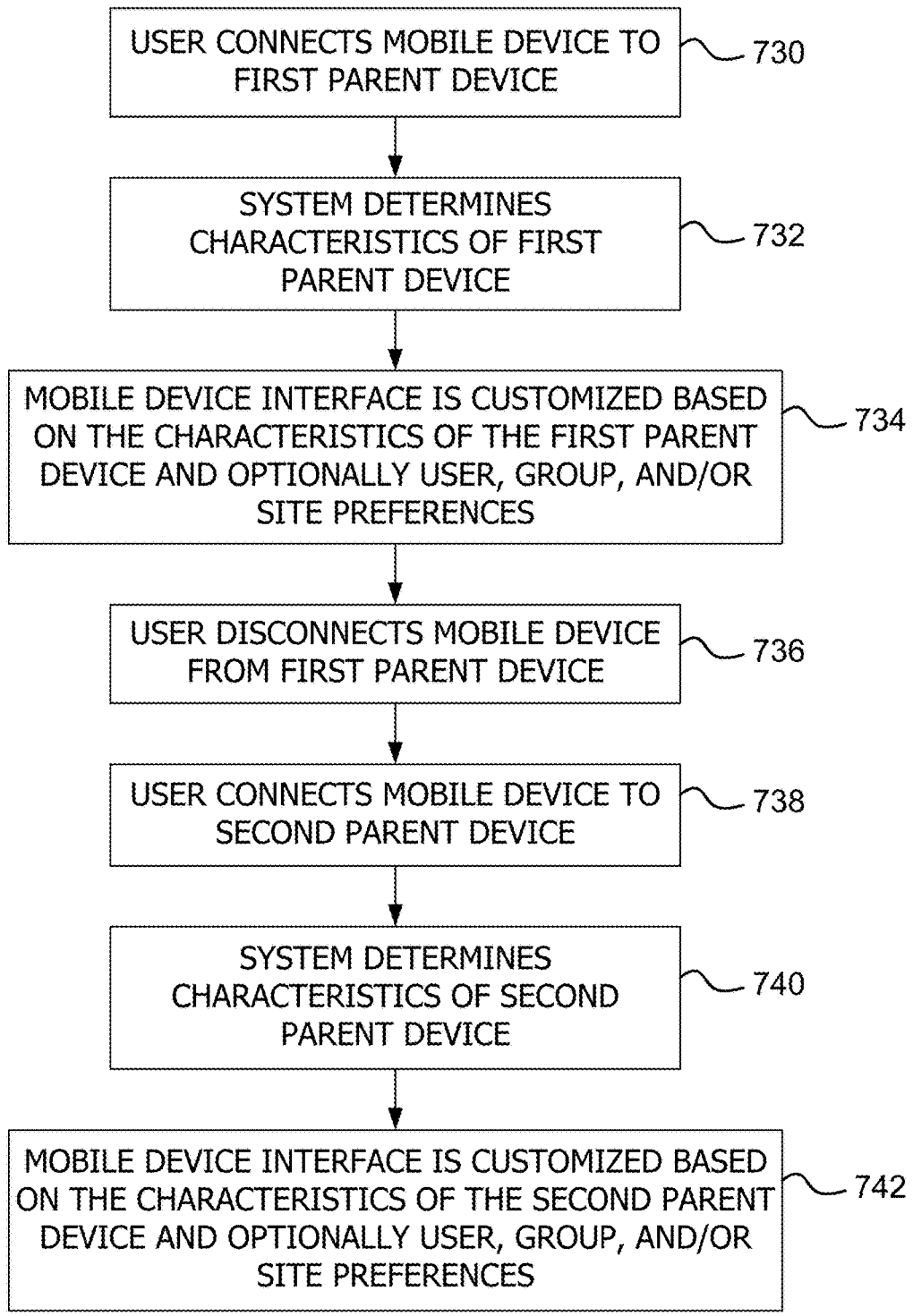
Figure 7C:
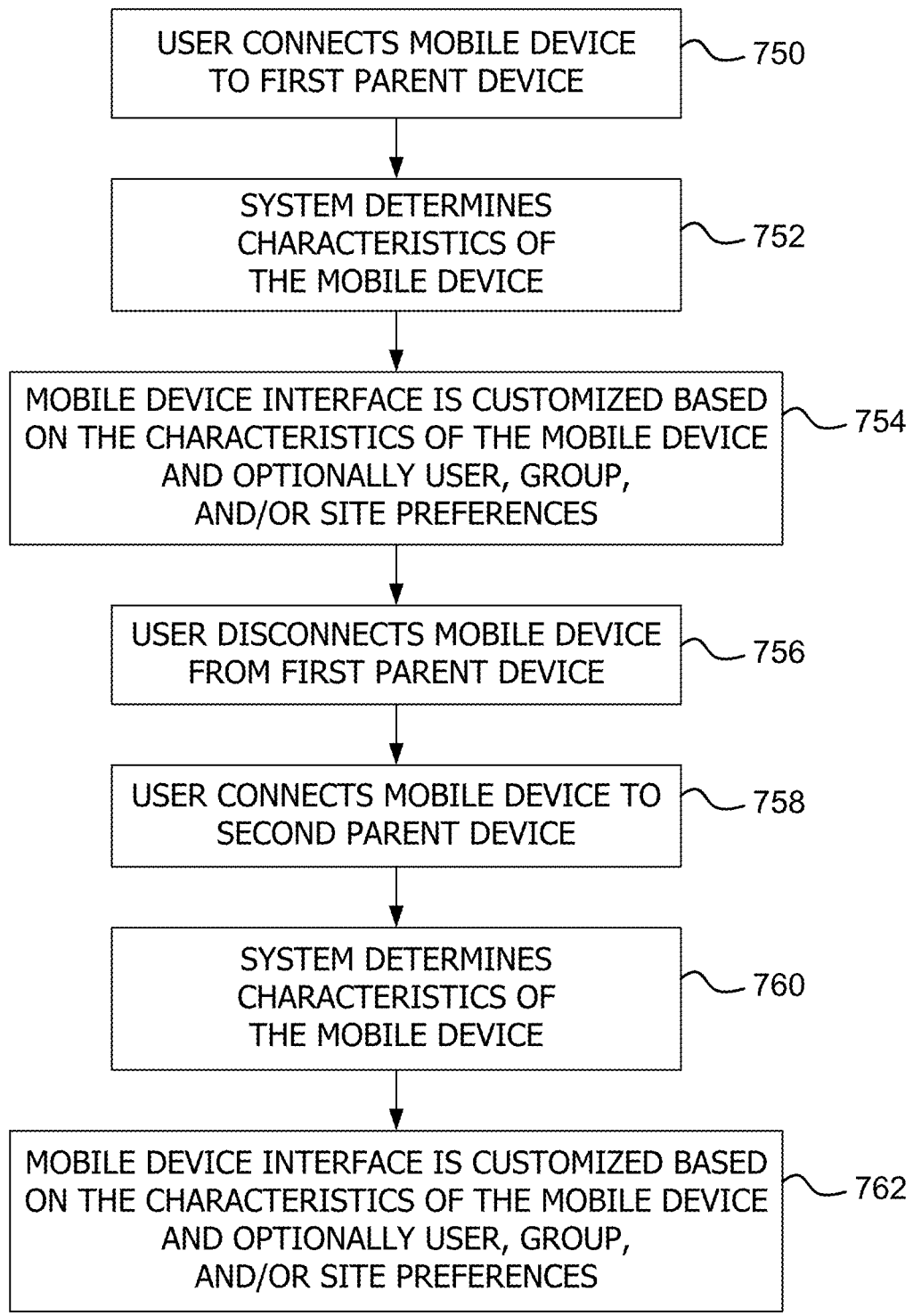

FIGS. 7A, 7B, and 7C are flowcharts depicting illustrative operations of a system for allowing a mobile computing device to function as an input device for a parent computing system, according to embodiments of the present disclosure. Specifically, FIG. 7A is a flowchart illustrating one embodiment of a method of allowing multiple users to interface with a PACS using custom displays that are user specific. FIG. 7B is a flowchart illustrating one embodiment of a method of customizing the user interface of a mobile device of a user based on the characteristics of the particular parent computing system, among other bases. FIG. 7C is a flowchart illustrating one embodiment of a method of customizing the user interface of a mobile device of a user based on characteristics of the mobile device, among other bases. In other embodiments, the methods described may include additional or fewer blocks and/or the blocks may be performed in a different order than is illustrated.

Referring now to FIG. 7A, the method begins at block 702 with the first user defining a first one or more input displays. As discussed above, the first user can define various types of input displays including any available type of keyboard layouts, keyboard functions, and/or input functions, among others. Additionally, multiple input displays can be created and preferences for moving between the multiple input displays may be set.

Next, at block 704, a second user defines a second one or more input displays. In one embodiment, the second users input displays are quite different than the first users input displays.

Next, at block 706, the input display data for both the first and second users is stored on their respective tablets (or other mobile device), on one or more PACS devices (or other parent computing systems) that are used by the users, and/or a network device, such as a device that stores data regarding input displays for multiple PACS users.

In an embodiment where the input display data is only stored on the tablets, the tablets may be configured to transmit the input display data to a parent computing system once connected, such as when a wired or wireless link with the parent computing system is established. In an embodiment where the input display data is stored on one or more parent computing systems and/or network devices, an identification of a user of the tablet may be provided to the parent computing system upon connection of the tablet to the parent computing system such that the input display data for the appropriate user can be retrieved.

In one embodiment, the input display data may be communicated to a tablet that has not previously been used by the user (or that does not store the input display data for some other reason). For example, a user may log into a PACS, possibly through a user interface on the tablet, and have the input display data transmitted from the PACS or other network data structure, so that the tablet, which may have not previously been used by the user, displays the user define custom input displays.

Moving on in the method of FIG. 7A, at block 708 the first user connects a tablet to a PACS device (or other parent computing system), and, at block 710, the PACS locates the input display data for the first user so that the PACS can properly communicate with the first user via the tablet. As noted above, the input display data for the user can be stored at one or more of various locations and accessed in various manners.

After using the PACS, at block 712, the first user disconnects from the PACS. Next, at block 714, the second user connects to the PACS and, at block 716, the PACS locates the input display data for the second user so that the PACS can properly communicate with the second users tablet. In this manner, the same PACS can interface with the first and second users each using different tablets (or, in some embodiments, the same tablet) and different input displays in quite different manners. For example, the first user may have four input displays defined while the second user may have only two input displays defined.

Turning now to FIG. 7B, the method begins at block 730 with a user connecting a mobile device (such as a tablet), to a first parent device (or other parent computing system, such as a PACS or EMR). Next, at block 732, the mobile device determines the characteristics of the first parent device. This may be accomplished, for example, through the transmission of a device identifier from the first parent device to the mobile device. Alternatively, the mobile device may communicate data to the first parent device to test and/or determine the capabilities of the first parent device. In another alternative, characteristics of the first parent device may be predetermined and stored at the mobile device, at the parent device, and/or at another computing device or accessible data store. In an embodiment, the first parent device characteristics are stored at the same location as the user input display data described above. In another embodiment, a software module with access to the hardware of the parent computer may dynamically identify the characteristics of the parent computer and communicate that information to the mobile device. Relevant characteristics of the parent device may include, for example, the type of device (for example, PACS, EMR, or other type of system), a display size of the device, the number of display devices connected to the parent computer, display dimensions of the device, input receiving capabilities of the device, information display capabilities of the device, information transfer capabilities of the device, or other characteristics.

At block 734, the mobile device interface is then customized based on the characteristics of the first parent device (and/or other optional characteristics and/or preferences described herein, such as user, user group, and/or site preferences). For example, when the first parent device is determined to be a PACS, the interface of the mobile device may be customized and/or optimized for image viewing and manipulation. Alternatively, when the first parent device is determined to be an EMR, the interface of the mobile device may be customized and/or optimized for viewing and inputting of textual information. Further, the types of information displayed, whether the display of the mobile device operates as a supplement to the display of the parent computing device, and/or whether the mobile computing device functions as an input device, display device, or both, may vary based on the determined characteristics of the parent device. In an embodiment, the interface of and/or information displayed on the mobile computing device may be customized based on any combination of the identity of the user, characteristics of the parent computing system, characteristics of the mobile computing device (as described below in reference to FIG. 7C), identity of a user group, user group preferences, default preferences, and/or site preferences.

At block 736, the user disconnects the mobile device from the first parent device. Then, at block 738, the user connects the mobile device to a second parent device. At this point, at blocks 740 and 742, and as described above in reference to blocks 732 and 734, the characteristics of the second parent device are determined and the interface of the mobile device is customized based on those characteristics (and/or other optional characteristics and/or preferences described herein, including user, user group, and/or site preferences). For example, while the first parent device may have been a PACS, and the interface of the mobile device may have been customized for image manipulation and viewing, the second parent device may be an EMR, and the interface of the mobile device may be customized for text input and viewing.

As described above, the user may customize one or more input displays that may be accessible by swiping from one display to the next. Each input display may additionally be customized specifically to the characteristics of particular parent computing systems. In some embodiments, only displays customized for a particular parent computing system are displayed to a user when the mobile device is in communication with that parent computing system.

In an embodiment, a single mobile computing device may be in simultaneous communication with two or more parent computing systems. For example, the interface of the mobile computing device may include multiple, switchable, input and/or display interfaces that each display information from, or provide input to, a different parent computing system.

Referring now to FIG. 7C, at block 750 a user connects a mobile device (such as a tablet), to a first parent device (or other parent computing system, such as a PACS or EMR). At block 752, the characteristics of mobile device are determined. Determination of the characteristics of the mobile device may be accomplished, for example, as the mobile device accesses characteristics information stored at one or more of the mobile device, the parent computing system, another computing device, and/or other accessible data store. Alternatively the mobile device and/or the parent computing system may automatically, or otherwise, test the capabilities and/or characteristics of the mobile device. In an embodiment, the mobile device characteristics are stored at the same location as the user input display data described above. In another embodiment, a software module with access to the hardware of the mobile device may dynamically identify the characteristics of the mobile device and communicate that information to the mobile device. Relevant characteristics of the mobile device may include, for example, type of device, display size of the device, number of parent computing systems connected to the mobile device, display dimensions of the device, input receiving capabilities of the device, information display capabilities of the device, information transfer capabilities of the device, and/or other characteristics.

At block 754, the mobile device interface is then customized based on the characteristics of the mobile device (and/or other optional characteristics and/or preferences described herein, such as user, user group, and/or site preferences). For example, the interface of the mobile device may vary based on the display size of the device, as the amount of information that may practically be displayed on a particular display size varies. In another example, the interface of the mobile device may vary based on processing power and/or other hardware capabilities of the device, as the hardware capabilities of the device may determine the complexity of the interfaces and/or information that the device may display. Further, the types of information displayed, whether the display of the mobile device operates as a supplement to the display of the parent computing device, and/or whether the mobile computing device functions as an input device, display device, or both, may vary based on the determined characteristics of the mobile device. In an embodiment, and as described above in reference to FIG. 7B, the interface of and/or information displayed on the mobile computing device may be customized based on any combination of the identity of the user, the characteristics of the parent computing system, the characteristics of the mobile computing device, the identity of a user group, user group preferences, default preferences, and/or site preferences, for example.

At block 756, the user disconnects the mobile device from the first parent device. Then, at block 758, the user connects the mobile device to a second parent device. At this point, at blocks 760 and 762, and as described above in reference to blocks 752 and 754, the characteristics of the mobile device are determined and the interface of the mobile device is customized based on those characteristics (and/or other optional characteristics and/or preferences described herein, including user, user group, and/or site preferences).

As noted above, the systems and methods discussed herein allow users to generate highly customized input displays for use on a tablet, or other mobile computer device, for control of other parent computer systems, such as PACS. These custom input displays may be stored as virtual customized keyboards, virtual touchscreens, microphone controllers, or other types of controls. Such custom input displays may be automatically configured when communication with a parent computing system is established.

Display Tilt Angle Input

Figure 8A:
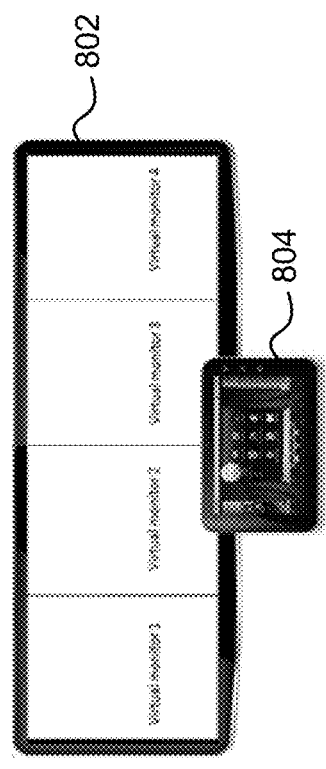
FIGS. 8A-8C illustrate a system in which a tilt angle of an electronic display is an input to a computing device, according to an embodiment of the present disclosure.
Figure 8B:
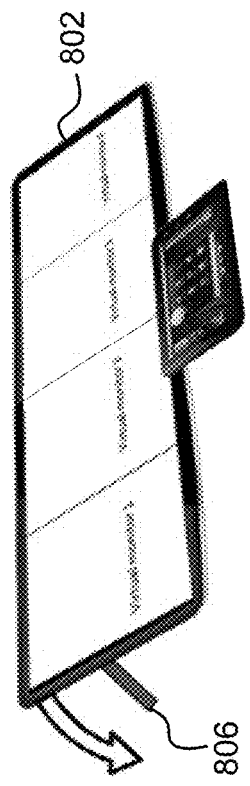
Figure 8C:
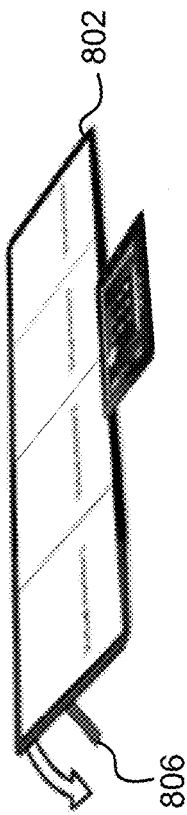

FIGS. 8A-8C illustrate a system in which a tilt angle of an electronic display 802 is an input to a computing device, according to an embodiment of the present disclosure. The display 802 may be a display of, for example, a parent computing system (such as a PACS), and may display information from that parent computing system. As described above, a mobile computing device 804 may be in communication with the parent computing system, and may allow a user of the mobile computing device to provide input to, and/or view information displayed from, the parent computing system.

In the embodiment of FIGS. 8A-8C, the display 802 also includes a leg 806 (or other support structure) that allows the display to be tilted to various angles, although other mechanisms may be used to allow the display to be tilted. In an embodiment, the display 802 and/or computing system coupled to the display includes hardware and/or software devices and/or modules configured for determining a tilt angle of the display, such as one or more accelerometers or video cameras. In the illustrated example, the display 802 additionally displays four virtual monitors or displays. Each virtual monitor may display information from the same parent computing system, or from one or more different parent computing systems.

The tilt angle of the display 802 may be used in customizing interactions that are available to a user. For example, depending on how far back the display is tilted, the system may automatically change the way inputs from the mobile device are received and/or interpreted. In an embodiment wherein the system includes one or more cameras or other sensor technology (for example, built into one or more of the monitors and/or separate cameras) that are configured to detect movement of the user and to determine gestures provided by the user, gesture detection hardware and/or software may be activated and deactivated based on the angle of the monitor. For example, a first user may have a preference indicating that when the monitor is tilted less than 30 degrees from the table (or other support), the gesture detector is disabled (for example, the camera may be turned off and/or the gesture detection software may be disabled), but if the monitor is tilted 80 degrees or more relative to the table, the gesture detector is enabled. Thus, a user may move the monitor to be in a more or less table top position where a first input method (for example, touchpad or touchscreen) is in control, and then when the monitor is titled more upright a second input method (for example, gestures) may be used, possibly in combination with the first input method also. Preferences for enabling and disabling gesture detection functionality may be customized by a user, user group, or system level, for example.

In an embodiment, the tilt angle detection and input customization described above may be implemented on the mobile computing device that is in communication with the parent computing system.

Figure 9:
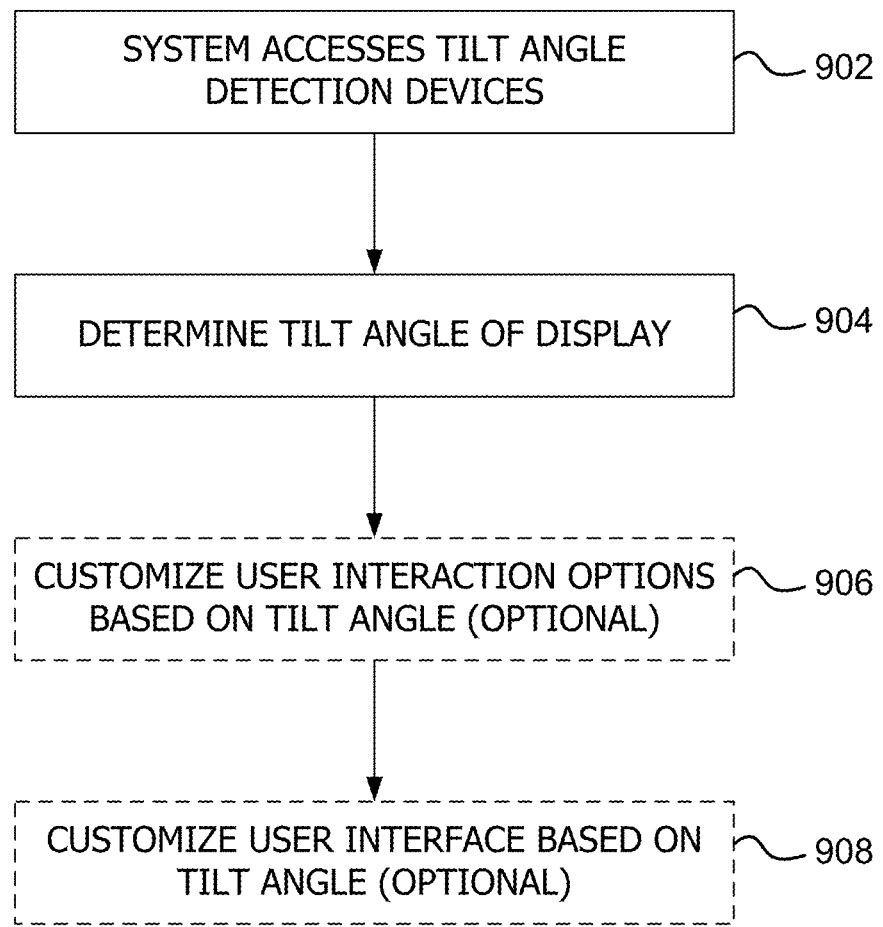
FIG. 9 is a flowchart depicting an illustrative operation of the system of FIGS. 8A-8B, according to an embodiment of the present disclosure.

FIG. 9 is a flowchart depicting an illustrative operation of the system of FIGS. 8A-8B, according to an embodiment of the present disclosure. In various embodiments, the methods described may include additional or fewer blocks and/or the blocks may be performed in a different order than is illustrated.

At block 902, the system, for example, the parent computing system and/or the mobile computing device, accesses the tilt angle detection devices of the system (as described above in reference to FIGS. 8A-8C). At block 904, the tilt angle of the display is determined based on the tilt angle detection information.

At optional block 906, user interaction options available to the user of the system may be customized based on the tilt angle of the display. For example, in an embodiment, a display may not accept touch input when mostly upright, but may accept touch input when tilted back at a particular angle. At optional block 908, the user interface of the system may be customized based on the tilt angle of the display. For example, and as described above, the interface of a display that is tilted back at a particular angle may include an interface optimized for touch, while the interface of the display may be optimized for gesture or mouse input when tilted to be mostly upright. In an embodiment, both the interaction options and the user interface of the display may be customized and/or optimized based on the tilt angle of the display.

Example Computing Systems

FIG. 10 is a system diagram showing various example components of a system in which a mobile computing device functions as an input device for various parent computing systems, according to various embodiments of the present disclosure. The diagram of FIG. 10 includes a mobile computing device 150a (for example, a tablet or smartphone) that may to serve as an input device for a parent computing system. Examples of parent computing systems include a generic parent computing device 150b, and various other specialized computing systems including an MRI scanner 120, a CT Scanner 122, an EMR Workstation 137, a PACS Workstation 138, a PACS System 136, a Digital Pathology System 146, a Radiology Information System 140, a Computer Aided Diagnosis System 148, an EMR System 142, a 3D Processing System 149, and a Laboratory System 144.

In the embodiment of FIG. 10, the mobile computing device 150a is in communication with the parent computing device 150b, such as a PACS, via any available communication medium 110, such as network communication (for example, a local area network), a wired connection (for example, a cable connected directly to the tablet and a USB port of the PACS), and/or a wireless connection (for example, a Bluetooth, cellular, or Wi-Fi connection). In other embodiments, the mobile computing device 150a may communicate with the parent computing device via other communication mediums.

Depending on the embodiment, the mobile computing device 150a may have computational power that is much less than the parent computing device. However, as shown by blocks 151a, 152a, 153a, 154a, 155a, 156a, and 157a, the mobile computing device 150a may include many or all of the same components that are discussed below with reference to the parent computing device 150b. For example, the mobile computing device 150a may include a processor, memory, and an operating system that are similar to those discussed below with reference to the parent computing device 150b.

In an embodiment, the mobile computing device 150a includes input display modules, which are generally the software that allows the mobile computing device 150a to perform the functions discussed above. For example, the input display modules on the mobile computing device 150a allow the user to define custom input displays, order the input displays, define transitions between the input displays, etc. The parent computing device 150b likewise has modules that allow the parent computing device 150b to interface with the input display modules of the mobile computing device 150a.

Discussed hereinafter are example features of the parent computing device 150b, but as discussed above, the mobile computing device 150a may include any combination of the components discussed below, as well as any other suitable components. Thus, the following description of the operation and functionality of the components of the parent computing device 150b should be understood to similarly apply to the components of the mobile computing device 150a.

In an embodiment, the parent computing device comprises a server, a desktop computer, a workstation, a PACS workstation, a laptop computer, a mobile computer, a smartphone, a tablet computer, a cell phone, a personal digital assistant, a gaming system, a kiosk, an audio player, any other device that utilizes a graphical user interface, including office equipment, automobiles, airplane cockpits, household appliances, automated teller machines, self-service checkouts at stores, information and other kiosks, ticketing kiosks, vending machines, industrial equipment, and/or a television, for example.

The parent computing device may take various forms. In one embodiment, the parent computing device may be a parent computing device having modules 151b, such as software modules. In other embodiments, modules 151b may reside on another computing device, such as a server (e.g., a web server or other server), and the user directly interacts with a second computing device that is connected to the web server via a computer network. In one embodiment, the modules 151b include some or all of the software components to implement the functionality of the systems and methods described above.

The computing device 150b may run an off-the-shelf operating system 154b such as a Windows, Linux, MacOS, Android, or iOS, or mobile versions of such operating systems. The computing device 150b may also run a more specialized operating system which may be designed for the specific tasks performed by the computing device 150b, or any other available operating system.

The computing device 150b may include one or more computing processors 152b. The computer processors 152b may include central processing units (CPUs), and may further include dedicated processors such as graphics processor chips, or other specialized processors. The processors generally are used to execute computer instructions based on the information display software modules 151b to cause the computing device to perform operations as specified by the modules 151b. The modules 151b may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. For example, modules may include software code written in a programming language, such as, for example, Java, JavaScript, ActionScript, Visual Basic, HTML, C, C++, or C#. While "modules" are generally discussed herein with reference to software, any modules may alternatively be represented in hardware or firmware. Generally, the modules described herein refer to logical modules that may be combined with other modules or divided into sub-modules despite their physical organization or storage.

The computing device 150b may also include memory 153b. The memory 153b may include volatile data storage such as RAM or SDRAM. The memory 153b may also include more permanent forms of storage such as a hard disk drive, a flash disk, flash memory, a solid state drive, or some other type of non-volatile storage.

The computing device 150b may also include or be interfaced to one or more display devices 155b that provide information to the users. Display devices 155b may include a video display, such as one or more high-resolution computer monitors, or a display device integrated into or attached to a laptop computer, handheld computer, smartphone, computer tablet device, or medical scanner. In other embodiments, the display device 155b may include an LCD, OLED, or other thin screen display surface, a monitor, television, projector, a display integrated into wearable glasses, or any other device that visually depicts user interfaces and data to viewers.

The computing device 150b may also include or be interfaced to one or more input devices 156b which receive input from users, such as a keyboard, trackball, mouse, 3D mouse, drawing tablet, joystick, game controller, touch screen (e.g., capacitive or resistive touch screen), touchpad, accelerometer, gyroscope, video camera and/or microphone.

The computing device 150b may also include one or more interfaces 157b which allow information exchange between computing device 150b and other computers and input/output devices using systems such as Ethernet, Wi-Fi, Bluetooth, as well as other wired and wireless data communications techniques. For example, the interfaces 157b may allow the computing device to communicate with various other devices via the computer network 110, which may take various forms. The computer network 110 may be a wired network or a wireless network, or it may be some combination of both. The computer network 110 may be a single computer network, or it may be a combination or collection of different networks and network protocols. For example, the computer network 110 may include one or more local area networks (LAN), wide area networks (WAN), personal area networks (PAN), cellular or data networks, and/or the Internet.

The modules of computing device 150b may be connected using a standard based bus system. In different embodiments, the standard based bus system could be Peripheral Component Interconnect ("PCI"), PCI Express, Accelerated Graphics Port ("AGP"), Micro channel, Small Computer System Interface ("SCSI"), Industrial Standard Architecture ("ISA") and Extended ISA ("EISA") architectures, for example. In addition, the functionality provided for in the components and modules of computing device 150 may be combined into fewer components and modules or further separated into additional components and modules. Various other devices and subsystems may be connected to the network 110. For example, one or more medical scanners may be connected, such as MRI scanners 120. The MRI scanners 120 may be used to acquire MRI images from patients, and may share the acquired images with other devices on the network 110. One or more CT scanners 122 may also be coupled to the network 110. The CT scanners 122 may also be used to acquire images and, like the MRI scanner 120, may then store those images and/or share those images with other devices via the network 110. Any other scanner or device capable of inputting or generating information that can be presented to the user as images, graphics, text, or sound, including ultrasound, angiography, nuclear medicine, radiography, endoscopy, pathology, dermatology, etc.

Also connected to the network 110 may be a Picture Archiving and Communications System (PACS) 136 and/or PACS workstation 138. The PACS 136 is typically used for the storage, retrieval, distribution and presentation of images (such as those created and/or generated by the MRI scanner 120 and CT Scanner 122). The medical images may be stored in an independent format, an open source format, or some other proprietary format. A common format for image storage in the PACS system is the Digital Imaging and Communications in Medicine (DICOM) format. The stored images may be transmitted digitally via the PACS system, often reducing or eliminating the need for manually creating, filing, or transporting film jackets.

Also connected to the network 110 may be a Radiology Information System (RIS) 140. The radiology information system 140 is typically a computerized data storage system that is used by radiology departments to store, manipulate and distribute patient radiological information such as radiology reports.

Also attached to the network 110 may be an Electronic Medical Record (EMR) system 142. The EMR system 142 may be configured to store and make accessible to a plurality of medical practitioners computerized medical records. Also attached to the network 110 may be a Laboratory Information System 144. Laboratory Information System 144 is typically a system which stores information created or generated by clinical laboratories. Also attached to the network 110 may be a Digital Pathology System 146 used to digitally manage and store information related to medical pathology.

Also attached to the network 110 may be a Computer Aided Diagnosis System (CAD) 148 used to analyze images. In one embodiment, the CAD 148 functionality may reside in a computing device separate from the computing device 150 while in another embodiment the CAD 148 functionality may reside within the computing device 150*b*.

Also attached to the network 110 may be a 3D Processing System 149 used to perform computations on imaging information to create new views of the information, e.g., 3D volumetric display, Multiplanar Reconstruction (MPR) and Maximum Intensity Projection reconstruction (MIP). In one embodiment, the 3D Processing functionality may reside in a computing device separate from computing device 150*b* while in another embodiment the 3D Processing functionality may reside within the computing device 150*b*.

Also connected to the network 110 may be a user preference database 160. In an embodiment, the user preference database 160 may be implemented as one or more databases or may be implemented using a relational data structure, such as Sybase, Oracle, CodeBase and Microsoft® SQL Server as well as other types of data structures such as, for example, a flat file data structure, an entity-relationship data structure, an object-oriented data structure, and/or a record-based data structure. Examples of information that may be stored in the user preference database 160 include user input display preferences, user input configuration preferences, device characteristics information, user identification information, and the like.

In other embodiments, other computing devices that store, provide, acquire, and/or otherwise manipulate medical data may also be coupled to the network 110 and may be in communication with one or more of the devices illustrated in FIG. 10, such as with the mobile computing device 150*a* and/or the parent computing device 150*b*.

Depending on the embodiment, the other devices illustrated in FIG. 10 (besides the computing devices 150*a* and 150*b*) may include some or all of the same components discussed above with reference to the computing devices 150*a* and/or 150*b*.

Other

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flowcharts described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by an Information Display Computing Device and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

Many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A mobile electronic device comprising:
a computer readable medium storing software modules including computer executable instructions;
one or more hardware processors in communication with the computer readable medium, and configured to execute one or more input display modules of the software modules in order to:
communicate with an associated parent computing system in order to send information to and receive information from the associated parent computing system via a plurality of input displays displayable on a display of the mobile electronic device, each of the plurality of input displays including a set of customizable input controls;
identify a user of the mobile electronic device;
access stored input display data associated with the user, the input display data comprising first user specific customizations of input controls within at least one of the plurality of input displays and second user specific customizations of an order of displaying at least two of the plurality of input displays;
display a first input display of the plurality of input displays on the mobile electronic device, wherein the first input display comprises a first configuration of the input controls supporting a first set of user input functionalities and wherein the first configuration of input controls included in the first input display is automatically customized according to the first user specific customizations of input controls included in the stored input display data associated with the user;

in response to a first user input received via the first input display of the mobile electronic device:
provide an indication of the first user input to the associated parent computing system causing the associated parent computing system to perform an operation; and
display, at the mobile electronic device, information received from the associated parent computing system,
wherein information displayed on a display of the associated parent computing system is updated in response to the first input provided to the associated parent computing system; and
in response to a second user input received via the first input display of the mobile electronic device scrolling to a next input display of the plurality of input displays, automatically replace the first input display, at the mobile electronic device, with a second input display of the plurality of input displays based on the second user specific customizations of an order of the plurality of input displays included in the stored input display data associated with the user, wherein the second input display comprises a second configuration of input controls supporting a second set of user input functionalities configured to provide indications of inputs to the associated parent computing system and wherein the second configuration of input controls included in the second input display is automatically customized according to the first user specific customizations of input controls included in the stored input display data associated with the user.

2. The mobile electronic device of claim 1, wherein the one or more hardware processors are further configured to execute the one or more input display modules in order to:
receive the input display data from a user; and
store the received input display data in a database associated with the mobile electronic device.

3. The mobile electronic device of claim 1, wherein the one or more hardware processors are further configured to execute the one or more input display modules in order to:
in response to communicating with the associated parent computing system, determine one or more characteristics of the associated parent computing system.

4. The mobile electronic device of claim 3, wherein the two or more input displays of the plurality of input displays are customized based on at least both the accessed input display data and the determined characteristics of the associated parent computing system.

5. The mobile electronic device of claim 4, wherein the two or more input displays of the plurality of input displays are further customized based on at least one of: one or more characteristics of the mobile electronic device, or input display data associated with a user group and/or site.

6. The mobile electronic device of claim 3, wherein the characteristics of the associated parent computing system include at least one of a type, a display, display dimensions, input receiving capabilities, information display capabilities, information transfer capabilities, or a number of display devices connected to the parent computing system.

7. The mobile electronic device of claim 1, wherein the two or more input displays of the plurality of input displays are customized based on at least both the accessed input display data and one or more characteristics of the mobile electronic device.

8. The mobile electronic device of claim 7, wherein the one or more characteristics of the mobile electronic device comprise at least one of technical specifications, a display size, available input methods, or available input sensors.

9. The mobile electronic device of claim 1, wherein the two or more input displays include at least one of a customized virtual keyboard, a replica of a display of the associated parent computing system, or a mobile electronic device optimized display.

10. The mobile electronic device of claim 1, wherein the user may customize at least one of a proximity, size, or order in which the plurality of input displays is selectable.

11. The mobile electronic device of claim 1, wherein identifying the user of the mobile electronic device includes receiving login information from the user.

12. The mobile electronic device of claim 1, wherein the parent computing system comprises a picture archiving and communication system.

13. The mobile electronic device of claim 1, wherein the parent computing system comprises an electronic medical record system.

14. The mobile electronic device of claim 1, wherein the mobile electronic device comprises a smartphone or a tablet.

15. A computer-implemented method comprising:
as implemented by one or more computer systems comprising computer hardware and memory, the one or more computer systems configured with specific executable instructions,
communicating with a parent computing system in order to send information to and receive information from the parent computing system via a plurality of input displays displayable on a display of a mobile electronic device, each of the plurality of input displays including a set of customizable input controls;
identifying a user of the mobile electronic device in communication with the parent computing system;
accessing stored input display data associated with the user, the input display data comprising first user specific customizations of input controls within at least one of the plurality of input displays and second user specific customizations of an order of displaying at least two of the plurality of input displays;
displaying, on the mobile electronic device, a first input display of the plurality of input displays, wherein the first input display includes a first configuration of input controls automatically customized based on the first user specific customizations of input controls included in the stored input display data associated with the user;
in response to a first user input via the first input display:
providing an indication of the first user input to the parent computing system causing the parent computing system to perform an operation; and
displaying, at the mobile electronic device, information received from the parent computing system,
wherein information displayed on a display of the parent computing system is updated in response to the first input provided to the parent computing system; and
in response to a second user input received via the mobile electronic device scrolling to a next input display of the plurality of input displays, automatically replacing, at the mobile electronic device, the first input display with a second input display of the plurality of the input displays based on the second user customizations of an order of input displays for the plurality of input displays included in the input display data associated with the user, wherein the second input display comprises a second configuration of input controls automatically customized according to the first user specific customizations of input controls included in the stored input display data associated with the user.

16. The computer-implemented method of claim 15, further comprising:

as implemented by the one or more computer systems, determining one or more characteristics of the parent computing system, wherein the two or more input displays of the plurality of displays are customized based on at least both the accessed input display data and the determined characteristics of the parent computing system.

17. The computer-implemented method of claim 16, wherein the two or more input displays of the plurality of displays are further customized based on one or more characteristics of the mobile electronic device.

18. The computer-implemented method of claim 17, wherein the two or more input displays of the plurality of displays are further customized based on input display data associated with a user group and/or site.

19. The computer-implemented method of claim 15, wherein the two or more input displays of the plurality of displays are customized based on at least both the accessed input display data and one or more characteristics of the mobile electronic device.

20. A mobile computing device comprising:
one or more hardware processors;
one or more storage devices storing software code configured for execution by the one or more hardware processors in order to:
communicate with a parent computing system by receiving input from a user for use in controlling operation of the parent computing system via a plurality of input displays displayable on a display of the mobile computing device, each of the plurality of input displays including a set of customizable input controls;
access stored input display data comprising a first customization of input controls for at least one of the plurality of input displays and a second customization of an order of displaying at least two of the plurality of input displays, wherein the first customization and the second customization are associated at least one or more of user/group/site preferences, mobile device characteristics, parent computer characteristics, or software used on the parent computer;
detect a first input by the user to the mobile computing device, the first input received via one or more of a touch screen, device button, gyroscope, accelerometer, camera, microphone, or fingerprint reader integrated into or in communication with the mobile device; and
in response to detecting the first input:
transmit information associated with the detected first input to the parent computing system;
display a first input display of the plurality of input displays on the mobile computing device based on the detected first input, the first input display including a first configuration of input controls automatically customized according to the first customization of input controls included in the stored input display data;
enable and/or disable a user input functionality for the first input display based at least partly on the detected first input;
detect a second input by the user to the mobile computing device, the second input scrolling through the plurality of input displays; and
in response to detecting the second input:
automatically replace the first input display, at the mobile computing device, with a second input display of the plurality of displays based on the detected second input and the second customization of an order for displaying the plurality of input displays included in the stored input display data, wherein the second input display includes a second configuration of input controls automatically customized according to the first customization of input controls included in the stored input display data.

21. The mobile computing device of claim 20, wherein the software code is further configured to cause the mobile computing device to receive from the parent computing system data configured to update the input display with visual information and/or play audio information.

22. The mobile electronic device of claim 1, wherein the one or more hardware processors are further configured to execute the one or more input display modules in order to:
communicate with a second parent computing system in order to send information to and receive information from the second parent computing system;
access second input display data associated with the second parent computing system;
provide a second two or more input displays configured to receive user inputs and provide indications of the user inputs to the second parent computing device, wherein:
the second two or more input displays are based on the accessed second input display data, and
the second two or more input displays include customizations that are different from the first and the second user specific customizations for the two or more input displays of the plurality of input displays.

* * * * *